United States Patent
Lin et al.

(10) Patent No.: US 8,184,569 B2
(45) Date of Patent: May 22, 2012

(54) METHOD FOR TERMINAL TO JOIN MULTICAST BROADCAST SERVICE IN WIRELESS NETWORK AND SYSTEM USING THEREOF

(75) Inventors: Zhibin Lin, Shenzhen (CN); Chengyan Feng, Shenzhen (CN); Yuankui Zhao, Shenzhen (CN); Changhong Shan, Shenzhen (CN); Liang Gu, Shenzhen (CN); Jianjun Wu, Shenzhen (CN); Musen Li, Shenzhen (CN); Anning Xie, Shenzhen (CN); Xianhui He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 483 days.

(21) Appl. No.: 12/407,463

(22) Filed: Mar. 19, 2009

(65) Prior Publication Data

US 2009/0219850 A1 Sep. 3, 2009

Related U.S. Application Data

(63) Continuation of application No. PCT/CN2007/070727, filed on Sep. 19, 2007.

(30) Foreign Application Priority Data

Sep. 19, 2006 (CN) .......................... 2006 1 0159430
Sep. 29, 2006 (CN) .......................... 2006 1 0159722

(51) Int. Cl.
*H04W 4/00* (2009.01)
*H04H 20/71* (2008.01)
(52) U.S. Cl. ............. 370/312; 370/329; 370/341; 726/5

(58) Field of Classification Search ......................... None
See application file for complete search history.

(56) References Cited

U.S. PATENT DOCUMENTS 7,852,794 B2 * 12/2010 Venkatachalam ............. 370/312
(Continued)

FOREIGN PATENT DOCUMENTS

CN 1352494 6/2002
(Continued)

OTHER PUBLICATIONS

Written Opinion, mailed Jan. 3, 2008, in corresponding International Application PCT/CN2007/070727 (4 pp.).

(Continued)

*Primary Examiner* — Chi Pham
*Assistant Examiner* — Soon-Dong Hyun
(74) *Attorney, Agent, or Firm* — Staas & Halsey LLP

(57) ABSTRACT

A method for a terminal to join a multicast broadcast service (MBS) in a wireless network and a wireless communication system are provided, so as to enable a terminal to successfully join an MBS and receive MBS content. The method and the system relate to a wireless communication field. A terminal obtains MBS parameters that include a first ID indicating an air interface connection and a second ID indicating MBS content from a network, so that the terminal can receive the MBS content indicated by the second ID from the air interface connection indicated by the first ID after receiving the MBS parameters and thus successfully join the MBS. The terminal may initiate an MBS join process by sending an MBS join request message, so as to obtain the MBS parameters and join the required MBS. The network may actively initiate the MBS join process to send the MBS parameters to the terminal and invite the terminal to join the MBS.

20 Claims, 10 Drawing Sheets

U.S. PATENT DOCUMENTS

| | | | |
|---|---|---|---|
| 2007/0173269 A1 | 7/2007 | Laroia et al. | |
| 2008/0008176 A1* | 1/2008 | Lim et al. | 370/390 |
| 2008/0056219 A1* | 3/2008 | Venkatachalam | 370/342 |
| 2008/0107060 A1* | 5/2008 | Andou et al. | 370/312 |
| 2008/0194294 A1* | 8/2008 | Ryon | 455/558 |
| 2008/0253322 A1* | 10/2008 | So et al. | 370/329 |
| 2008/0259878 A1* | 10/2008 | Connors et al. | 370/336 |
| 2008/0285497 A1* | 11/2008 | Pichna et al. | 370/312 |
| 2010/0046410 A1* | 2/2010 | So et al. | 370/312 |

FOREIGN PATENT DOCUMENTS

| | | |
|---|---|---|
| CN | 1450751 | 10/2003 |
| CN | 1777095 | 5/2006 |
| CN | 1780413 | 5/2006 |
| EP | 1679820 | 7/2006 |
| WO | WO-2005076562 | 8/2005 |

OTHER PUBLICATIONS

Office Action, mailed May 12, 2010, in corresponding Chinese Application 200610159430.3 (11 pp.).

*802.16 IEEE Standard for Local and metropolitan area networks, Part 16: Air Interface for Fixed Broadband Wireless Access Systems,* IEEE Oct. 1, 2004, pp. 1-857.

*MBS Refinement,* IEEE 802.16 Broadband Wireless Access Working Group, Apr. 28, 2005, pp. 0-7.

*IEEE Standard for Local and metropolitan area networks, Part 16: Air Interface for Fixed Broadband Wireless Access Systems, Amendment 2: Physical and Medium Access Control Layers for Combined Fixed and Mobile Operation in Licensed Bands and Corrigendum 1,* IEEE Feb. 28, 2009, pp. 1-822.

Office Action, mailed Mar. 9, 2011, in corresponding Chinese Application No. 200610159722.7 (20 pp.).

* cited by examiner

METHOD FOR TERMINAL TO JOIN MULTICAST BROADCAST SERVICE IN WIRELESS NETWORK AND SYSTEM USING THEREOF

CROSS-REFERENCE TO RELATED APPLICATIONS

The application is a continuation of International Application No. PCT/CN2007/070727, filed Sep. 19, 2007, which claims the benefit of Chinese Patent Application No. 200610159430.3, filed on Sep. 19, 2006 and Chinese Patent Application No. 200610159722.7, filed on Sep. 29, 2006, all of which are hereby incorporated by reference in their entireties.

FIELD OF THE INVENTION

The present invention relates to the field of wireless communication, and more particularly to a multicast broadcast technology.

BACKGROUND OF THE INVENTION

Worldwide interoperability for microwave access (WiMAX) is a wireless metropolitan area network (MAN) access technology that basically aims to provide an interoperable broadband wireless access means in a point-to-multipoint (PTM) multi-vendor environment in an MAN.

Existing standards specify that an air interface protocol layer of a WiMAX system mainly includes a physical (PHY) layer and a medium access control (MAC) layer. The PHY layer physically performs operations such as modulation, demodulation, encoding, and decoding of signals. The MAC layer mainly performs a MAC function of the WiMAX system.

FIG. 1 shows an end-to-end reference model of a WiMAX system, in which an RI interface is a wireless air interface and other interfaces are all wired interfaces.

Referring to FIG. 1, the WiMAX system mainly includes a mobile station (MS)/user station (SS), an access service network (ASN), and a connectivity service network (CSN).

The ASN is defined as a set of network functions that provide wireless access services to WiMAX user terminals, and includes a base station (BS) and an ASN gateway (ASN-GW). One ASN may be shared by a plurality of CSNs.

The CSN is defined to provide IP connectivity services to the WiMAX user terminals.

The MS/SS is a (mobile) terminal, with which a user accesses the WiMAX network.

Many of multimedia services require a plurality of users to concurrently receive the same data, such as video on demand, television broadcast, video conferencing, online education, and interactive gaming. Currently, the services may be realized through an Internet Protocol (IP) multicast and broadcast technology in the wired network. However, if the services are implanted to the mobile network, the services have large data amount and long duration, and are delay sensitive as compared with the common data, and the mobile network has special network structures, function entities, radio interfaces, etc., so the existing IP multicast and broadcast technology cannot be applied to the mobile network directly.

In order to effectively use the mobile network resources, the WiMAX defines a multicast broadcast service (MBS). The MBS is a point to multipoint (PTM) service in which one data source is provided in the mobile network to send data to multiple users, so as to realize shared network resources and improve the utilization of the network resources, especially the air interface resources. The MBS defined by the WiMAX not only implements the multicast and broadcast of pure text messages at a low rate, but also implements the multicast and broadcast of high-rate multimedia services, which undoubtedly conforms to the development trend of the mobile data services.

The MBS based on the WiMAX network supports two access modes, namely, single-BS access and multi-BS access. In the multi-BS access mode, the concept of an MBS zone (identified by an MBS zone ID) is defined, which is a set of BSs. All BSs in one MBS zone use the same Multicast CID and MBS Group Security Association (MBS GSA) ID, and send the contents of the same MBS flow. The terminal that has registered the MBS may receive the data of the MBS through multiple BSs in the MBS zone. When a terminal in an idle mode moves from one BS to another BS in the MBS zone, the terminal does not need to reestablish a connection, and can receive the MBS without being affected, which realizes the seamless handoff of the MBS. The single-BS access to MBS is a particular case of the multi-BS access to MBS. In this case, MBS zones are defined within the coverage of a BS, and all users in one MBS zone that receive the MBS use the same Multicast CID. In the prior art, the single-BS mode is not described in detail, but corresponding descriptions about how a BS sends MBS data, how a terminal receives the MBS data, and how the BS notifies the terminal that the MBS data of interest has been sent in the multi-BS mode can be found.

In existing protocols, the air interface in the MBS system has been described; the technology describing how to a terminal joins the MBS is not available.

SUMMARY OF THE INVENTION

Accordingly, the present invention is directed to a method for a terminal to join an MBS in a wireless network and a system using the same, so as to enable a terminal to successfully join an MBS and receive MBS content.

The present invention provides a method for a terminal to join an MBS in a wireless network. The method is as follows.

A terminal obtains MBS parameters from a network, in which the MBS parameters include a first ID indicating an air interface connection and a second ID indicating MBS content.

The terminal receives the MBS content indicated by the second ID from the air interface connection indicated by the first ID according to the MBS parameters.

The present invention also provides a wireless communication system. The system includes a terminal and network equipment. The network equipment includes a unit adapted to provide MBS parameters to the terminal. The MBS parameters include a first ID indicating an air interface connection and a second ID indicating MBS content. The terminal includes a unit adapted to obtain the MBS parameters from a network and a unit adapted to receive the MBS content indicated by the second ID from the air interface connection indicated by the first ID according to the obtained MBS parameters.

The present invention also provides a wireless communication system. The system includes an MBS network and a bearer network.

The MBS network is adapted to deliver an MBS authorization key (MAK) to a terminal.

The bearer network is adapted to deliver multicast parameters and an MGTEK of an MBS to the terminal and instruct the terminal to receive the corresponding MBS on a bearer indicated by the multicast parameters according to an MTK generated from the MAK and the MGTEK.

In various embodiments of the present invention, the terminal initiates an MBS join process by sending an MBS join request message, or the network initiates the MBS join process. In the MBS join process, the terminal obtains the MBS parameters that include the first ID indicating the air interface connection and the second ID indicating the MBS content from the network, so that the terminal can receive the MBS content indicated by the second ID from the air interface connection indicated by the first ID after receiving the MBS parameters and thus successfully join the MBS.

BRIEF DESCRIPTION OF THE DRAWINGS

The present invention becomes more fully understood from the detailed description given herein below for illustration only and by referring to the accompanying drawings among which.

DETAILED DESCRIPTION OF THE EMBODIMENTS

In order to make the objectives, technical solutions, and advantages of the present invention more comprehensible, the present invention is described in further detail below by reference to the accompanying drawings.

In the embodiments of the present invention, a terminal obtains MBS parameters that include a first ID indicating an air interface connection and a second ID indicating MBS content from a network, so that the terminal can receive the MBS content indicated by the second ID from the air interface connection indicated by the first ID after receiving the MBS parameters and thus successfully join the MBS.

Figure 1:
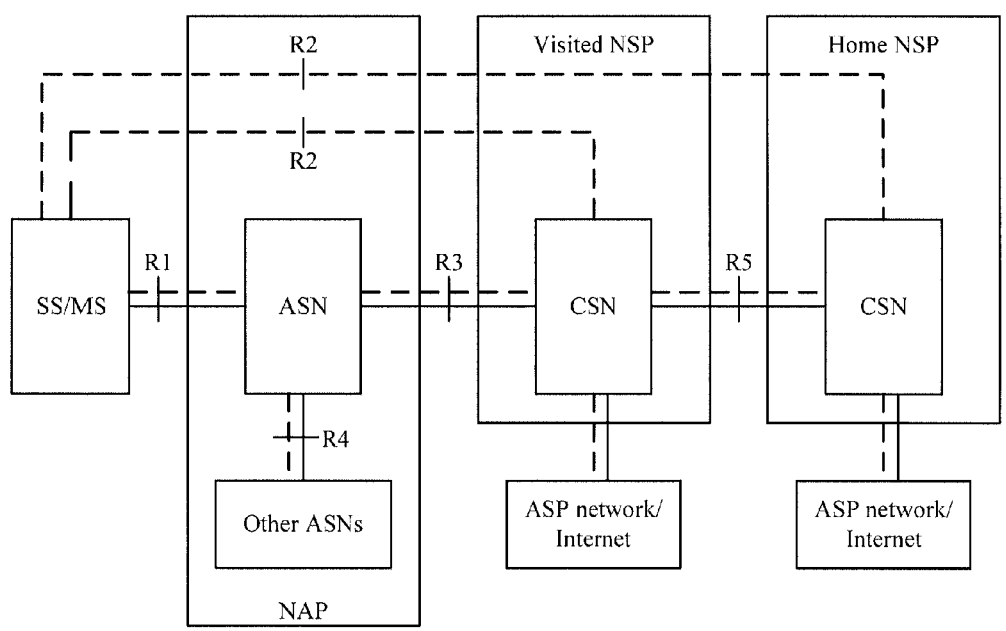
FIG. 1 is a schematic structural view of a WiMAX network in the prior art.
Figure 2:
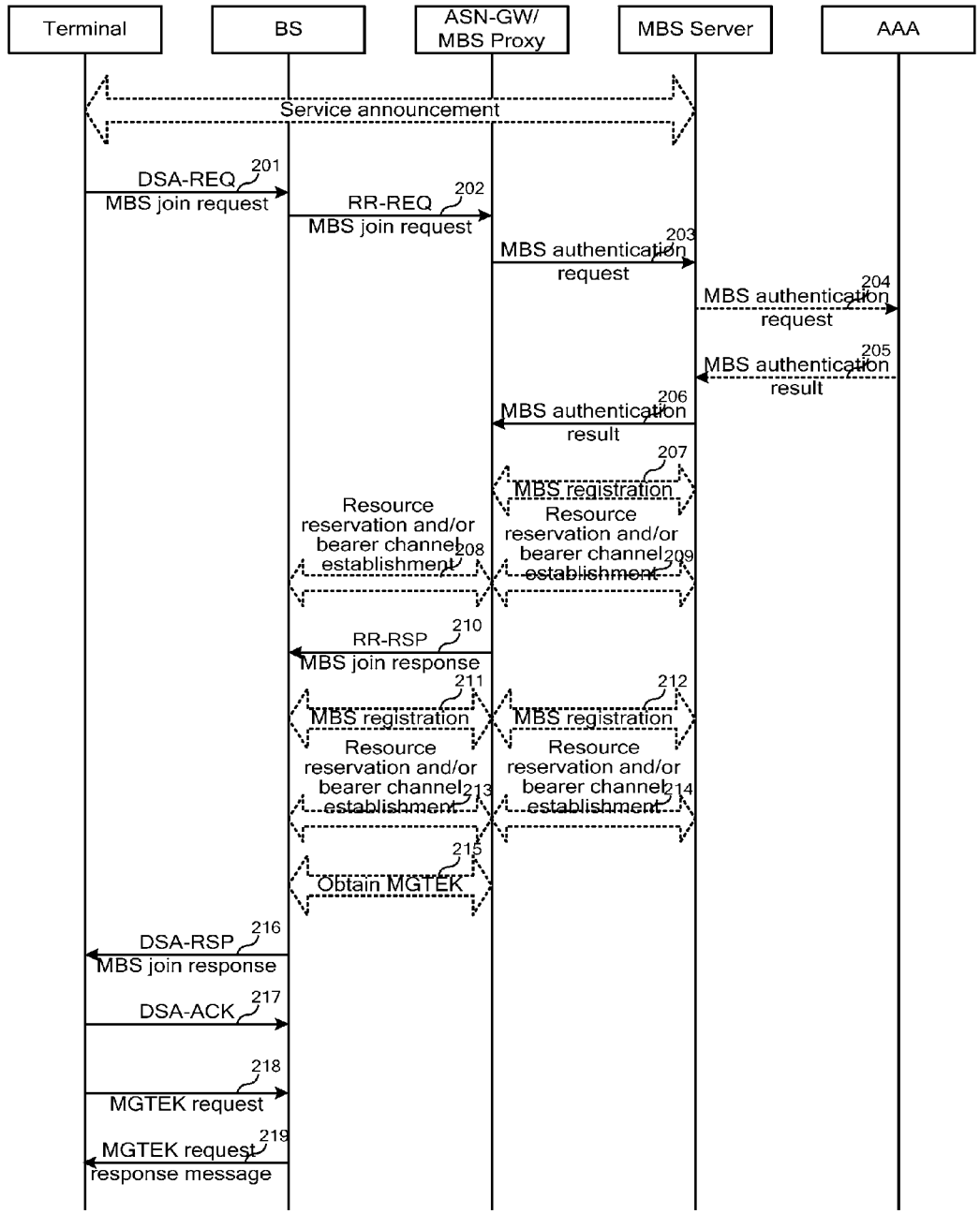
FIG. 2 is a flow chart of a method for a terminal to join an MBS in a wireless network according to a first embodiment of the present invention.

A first embodiment of the present invention is described below. The first embodiment of the present invention relates to a method for a terminal to join an MBS in a wireless network. In this embodiment, the terminal actively initiates an MBS join process. The terminal has known MBS zones where the MBS of interest is provided before joining the MBS. In practice, the terminal can obtain relevant information during a service announcement phase. The terminal may also know MBS zones where a current base station (BS) belongs to from a downlink channel descriptor (DCD) message broadcasted by the BS. If the broadcasted MBS zones include an MBS zone where the MBS of interest of the terminal is located, the terminal initiates the MBS join process. Referring to FIG. 2, the method includes the following steps.

In Step 201, the terminal sends an MBS join request message DSA-REQ to the BS. The message carries an MBS zone ID of an MBS zone where the MBS to be joined is located and/or MBS authentication information.

Optionally, the message may also carry maximum MBS capability information currently supported by the terminal so as to inform a network. The network determines whether the terminal is capable of normally receiving the service according to actual quality of service (QoS) requirements of the MBS.

Optionally, the message may also carry an MBS ID. The MBS ID may be one or any combination of a multicast IP address and/or a port number, MBS content ID, an authorization token, and an MBS zone ID. The terminal may obtain the MBS ID in the process of obtaining an MBS authorization key (MAK).

In Step 202, after receiving the MBS join request of the terminal, the BS first verifies a hashed message authentication code/cipher-based message authentication code (HMAC/CMAC) of the request message to verify whether the terminal is a valid user of the network. After the verification succeeds, the BS sends an MBS join request message such as a resource reservation request (RR-REQ) to an access service network gateway (ASN-GW). The message carries a terminal ID MSID, an MBS zone ID, and/or MBS authentication information. This step also has the following circumstances.

a) If resources for bearing the MBS between the BS and the ASN-GW are not pre-configured, no corresponding resources have been reserved, and the BS currently holds resource reservation information required by the MBS, the MBS join request message sent by the BS to the ASN-GW further contains an RR-REQ requesting for reserving corresponding resources for the MBS on the BS and the ASN-GW.

b) If a bearer channel for transmitting the MBS between the BS and the ASN-GW is not pre-configured, no corresponding bearer channel has been established, and the BS holds bearer channel information required by the MBS, the MBS join request message sent by the BS to the ASN-GW further contains a bearer channel establishment request requesting for establishing a bearer channel for transmitting the MBS on the BS and the ASN-GW. The bearer channel between the BS and the ASN-GW may be realized through tunneling technologies such as Generic Route Encapsulation (GRE), virtual local area network (VLAN), and Multi Protocol Label Switching (MPLS) of the prior art.

c) In the case that the request message contains the maximum MBS capability information of the terminal, if the BS holds actual capability requirements of the MBS, that is, the resource reservation information required by the MBS, the BS directly determines whether the terminal is capable of normally receiving the MBS. If the BS does not hold the resource reservation information of the MBS, the MBS join request message sent by the BS to the ASN-GW further contains the maximum MBS capability information of the terminal, so as to request the ASN-GW to further decide the terminal.

In Step 203, after receiving the MBS join request from the BS, the ASN-GW sends an MBS authentication request to an MBS server to request the MBS server to verify whether the terminal has the right to receive the MBS. The request may also carry an MBS zone ID, a network access ID (NAI) of the terminal and/or MBS authentication information. This step also has the following circumstances.

a) If the ASN-GW or a functional entity such as a service flow authorization (SFA) or an MBS proxy in the ASN-GW has stored MBS authorization information (service authentication result), the ASN-GW does not need to send the MBS authentication request to the MBS server, and can simply process the MBS join request of the corresponding terminal according to the stored MBS authorization information.

b) If resources for bearing the MBS between the ASN-GW and the MBS server are not pre-configured, no corresponding resources have been reserved, and the ASN-GW holds resource reservation information required by the MBS, in this step, the MBS authentication request sent by the ASN-GW to the MBS server further contains an RR-REQ requesting for reserving corresponding resources for bearing the MBS on the ASN-GW and MBS server.

c) If a bearer channel for transmitting the MBS between the ASN-GW and the MBS server is not pre-configured, no corresponding bearer channel has been established, and the ASN-GW holds bearer channel information required by the MBS, in this step, the MBS authentication request sent by the ASN-GW to the MBS server further contains a bearer channel establishment request requesting for establishing a bearer channel for transmitting the MBS on the ASN-GW and the MBS server. The bearer channel between the ASN-GW and the MBS server may be realized through tunneling technologies such as GRE, Layer2 Tunneling Protocol (L2TP), VLAN, MPLS, and IP Security (IPSec), or through IP multicast technologies such as the Internet Group Management Protocol (IGMP) and Multicast Listener Discovery (MLD).

d) After the ASN-GW receives the maximum MBS capability information of the terminal, if the ASN-GW holds actual capability requirements of the MBS, that is, the resource reservation information, the ASN-GW determines whether the terminal is capable of normally receiving the MBS according to the received maximum capability information of the terminal and the resource reservation information required by the MBS. Otherwise, if the ASN-GW currently does not hold the resource reservation information of the MBS, the ASN-GW temporarily stores the received maximum capability information of the terminal for making a further decision subsequently.

In Step 204, after the MBS server receives the MBS authentication request from the ASN-GW, if the MBS server stores the MBS authorization information of the terminal, the MBS server retrieves the MBS authorization information and determines whether the terminal is capable of using the MBS, for example, whether the terminal belongs to a subscriber group of the MBS, whether the terminal has been authorized, or whether the terminal has obtained the MAK. If the MBS server does not store the corresponding information and cannot independently determine whether the terminal is capable of using the MBS, the MBS server also needs to request an authentication, authorization, and accounting (AAA) server of the terminal to perform MBS authentication.

If the AAA server receives the authentication request from the MBS server, Step 205 is performed. In this step, the AAA server determines whether the terminal is capable of using the MBS according to user subscription information and a service policy, and returns a service authentication result to the MBS server. Meanwhile, optionally, the AAA server may also deliver the MBS subscription information of the terminal to the MBS server, so as to enable the MBS server to directly process the received MBS authentication request of the terminal in subsequent processes.

In Step 206, the MBS server returns the MBS authentication result to the ASN-GW. Meanwhile, optionally, the MBS server may deliver the MBS authentication information of the terminal to the ASN-GW or a functional entity such as the SFA and the MBS proxy in the ASN-GW, so as to enable the ASN-GW to directly process the received MBS join request of the terminal in subsequent processes. This step also has any of the following circumstances.

a) Optionally, if a range of providing the MBS is dynamically established and no terminal within the ASN or MBS zone has received the MBS, the MBS server may directly update a downlink providing list of the MBS after the MBS authentication is passed, that is, add an ID or an IP address of the ASN-GW or the MBS proxy into the downlink providing list of the MBS.

b) Optionally, after the MBS authentication is passed, the MBS server updates statistics of user number of the MBS, so as to determine an actual number of users currently using the MBS.

c) Optionally, if an ASN network entity such as the BS and the ASN-GW does not know the resource reservation information and/or bearer channel information required by the MBS, in this step, the MBS server may concurrently deliver the resource reservation information and/or bearer channel information required by the MBS.

d) Corresponding to the option b) of Step 203, if the MBS server receives the RR-REQ from the ASN-GW, the MBS server determines whether to accept the RR-REQ according to a resource condition and service policy thereof, and returns a resource reservation result to the ASN-GW in this step.

e) Corresponding to the option c) of Step 203, if the MBS server receives the bearer channel establishment request from the ASN-GW, the MBS server determines whether to accept the request according to the resource condition and the service policy thereof, and returns a bearer channel establishment result to the ASN-GW in this step.

Optionally, in Step 207, if the range of providing the MBS is dynamically established, no terminal within the ASN or MBS zone has received the MBS, and the MBS server does not update the downlink providing list in Step 206, the ASN-GW or MBS proxy registers the MBS with the MBS server after the MBS authentication is passed, to trigger the MBS server to update the downlink providing list of the MBS stored therein, that is, to add the ID or the IP address of the ASN-GW or the MBS proxy into the downlink providing list of the MBS. In addition, if no bearer channel has been established between the ASN-GW and the MBS server, or the bearer channel information and/or resource reservation information of the MBS have not been delivered (that is, the ASN-GW/MBS proxy does not have the bearer channel information and/or resource reservation information of the MBS, and cannot request the MBS server to establish a corresponding bearer channel and/or to reserve corresponding resources), the MBS server delivers the bearer channel information and/or resource reservation information of the MBS to the ASN-GW/MBS proxy when responding to the registration request.

Optionally, in Step 208, if the bearer channel and/or reserved resources for transmitting the MBS between the BS and the ASN-GW are not pre-configured, and no corresponding resources have been reserved and/or no corresponding bearer channel has been established (that is, the BS does not send the bearer channel establishment request and/or RR-REQ in Step 202), the ASN-GW sends an RR-REQ and/or a bearer channel establishment request to the BS to reserve resources and/or establish a corresponding bearer channel for transmitting the MBS between the BS and the ASN-GW.

Optionally, in Step 209, if the bearer channel and/or reserved resources for transmitting the MBS between the ASN-GW and the MBS server are not pre-configured, and no corresponding resources have been reserved and/or no corresponding bearer channel has been established (that is, the ASN-GW does not send the bearer channel establishment request and/or RR-REQ in Step 203), the ASN-GW sends an RR-REQ and/or a bearer channel establishment request to the MBS server to reserve resources and/or establish a corresponding bearer channel for transmitting the MBS between the ASN-GW and the MBS server.

Step 208 and Step 209 may be performed in any sequence or in parallel.

Then, Step 210 is performed. In this step, after receiving the MBS authentication result from the MBS server, the ASN-GW returns a result of the MBS join request to the BS according to the authentication result. This step also has any of the following circumstances.

a) Corresponding to the circumstance a) of Step 202, if the ASN-GW receives the RR-REQ of the BS, the ASN-GW determines whether to accept the RR-REQ according to a network resource condition and a service policy. If yes, the ASN-GW reserves corresponding resources. In this step, the ASN-GW returns a resource reservation result to the BS.

b) Corresponding to the circumstance b) of Step 202, if the ASN-GW receives the bearer channel establishment request of the BS, the ASN-GW determines whether to accept the request according to the network resource condition and the service policy. If yes, the ASN-GW establishes a corresponding bearer channel. In this step, the ASN-GW returns a bearer channel establishment result to the BS.

c) Optionally, if the ASN-GW does not have the resource reservation information required by the MBS and cannot determine the capability of the terminal in Step 203 d), but receives the resource reservation information of the MBS delivered by the MBS server in a subsequent step such as Step 206, the ASN-GW determines whether the terminal is capable of normally receiving the MBS according to the resource reservation information of the MBS delivered by the MBS server and the maximum MBS capability information of the terminal stored in Step 203 d), and notifies a determination result to the BS in this step.

d) Optionally, if the range of providing the MBS is dynamically established and no terminal within the BS has received the MBS, the ASN-GW also needs to update the downlink providing list of the MBS after the MBS authentication is passed, that is, add a BS ID (BSID) or the ID or the IP address of the ASN-GW into the downlink providing list of the MBS.

e) Optionally, after receiving a message indicating that the MBS authorization is passed, the ASN-GW may directly update statistics of the user number of the MBS, so that the ASN-GW or the MBS proxy can correctly determine the number of users currently using the MBS within the coverage of the BS and thus know the number of users using the MBS within the ASN or MBS zone.

f) Corresponding to the circumstance c) of Step 206, optionally, after obtaining the resource reservation information and bearer channel information of the MBS, the ASN-GW delivers both of the information to the BS in this step.

Optionally, in Step 211, after the BS receives a response to the MBS join request, if the range of providing the MBS is dynamically established, no terminal within the BS has received the MBS, and the ASN-GW has not updated the downlink providing list, the BS registers the MBS with the ASN-GW after the MBS authentication is passed, so as to trigger the ASN-GW to update the downlink providing list of the MBS stored therein, that is, to add the BSID into the downlink providing list of the MBS. After the ASN-GW updates the downlink providing list, if no bearer channel has been established between the ASN-GW and the MBS server, and the ASN-GW has not initiated an MBS registration to the MBS server, the ASN-GW may further register the MBS with the MBS server, so as to update the downlink providing list of the MBS in the MBS server, that is, to trigger the MBS server to add the ID or the IP address of the ASN-GW or the MBS proxy into the downlink providing list of the MBS.

Optionally, in Step 212, after the ASN-GW receives a registration request of the BS, if no bearer channel for transmitting the MBS between the ASN-GW and the MBS server has been established and/or no resources have been reserved, and the ASN-GW has not initiated a registration to the MBS server in previous steps, the ASN-GW may register the MBS with the MBS server in this step. The MBS server delivers the corresponding resource reservation information and/or bearer channel information when responding to the registration request. After receiving the resource reservation information and/or bearer channel information, the ASN-GW further delivers the resource reservation information and/or bearer channel information of the MBS to the BS when responding to the registration request of the BS.

Optionally, in Step 213, after the BS receives the resource reservation information and/or bearer channel information, if the bearer channel and/or reserved resources for transmitting the MBS between the BS and the ASN-GW are not pre-configured, and in previous steps, the BS has not sent the corresponding RR-REQ and/or bearer channel establishment request and the ASN-GW has not actively delivered the RR-REQ and/or bearer channel establishment request, the BS sends an RR-REQ and/or a bearer channel establishment request to the ASN-GW in this step to reserve resources and/or establish a corresponding bearer channel for transmitting the MBS between the BS and the ASN-GW.

Optionally, in Step 214, after the ASN-GW reserves corresponding resources and/or establishes a corresponding bearer channel for the MBS, if the bearer channel and/or reserved resources for transmitting the MBS between the ASN-GW and the MBS server are not pre-configured, and no corresponding resources have been reserved and/or no corresponding bearer channel has been established in previous steps, the ASN-GW sends an RR-REQ and/or a bearer channel establishment request to the MBS server in this step to reserve resources and/or establish a corresponding bearer channel for transmitting the MBS between the ASN-GW and the MBS server.

Optionally, in Step 215, if the BS transmits the MBS in a link layer multicast mode and the MBS is not a broadcast service, the BS also needs to obtain an MBS group traffic encryption key (MGTEK). The key is used to generate an MBS traffic key (MTK) of the MBS for air interface transmission.

The BS may send an MGTEK request message to the ASN-GW to request the ASN-GW to deliver the MGTEK generated by the ASN-GW to the BS. If the ASN-GW has not generated the MGTEK for the MBS, the ASN-GW firstly generates an MGTEK for the MBS and then delivers the generated MGTEK to the BS.

If the BS already has an MGTEK or can generate the MGTEK, this step is omitted, or the BS is triggered to generate the MGTEK in this step.

Then, Step 216 is performed. In this step, the BS sends an MBS join response message DSA-RSP to the terminal. The message carries an MBS zone ID, an air interface connection ID (CID) or an air interface multicast CID (MCID), all MBS content IDs borne by the CID or MCID, and a Group Security Association (GSA) ID corresponding to the MBS that the terminal requests to join.

Then, Step 217 is performed. In this step, after receiving the MBS join response message, the terminal sends an MBS join acknowledgement message DSA-ACK to the BS to acknowledge that the process has been completed.

Optionally, when the terminal joins the MBS, the BS may update statistics of the user number of the MBS within the coverage thereof.

Then, Step 218 is performed. In this step, after obtaining the GSA ID, the terminal initiates a key request message to the BS to request the MGTEK of the MBS. The request message carries the GSA ID of the MBS.

Then, Step 219 is performed. In this step, after receiving the request, the BS sends the MGTEK generated or obtained previously to the terminal. The terminal generates an MTK according to the MAK obtained previously and the MGTEK, and receives the corresponding MBS according to MBS parameters obtained from the network.

In this embodiment, the resource reservation information refers to description information of resources required for bearing the MBS, such as classifier parameters and rules, QoS parameters, and/or header compression parameters and rules. The bearer channel information refers to resource description information required by the bearer channel for bearing the MBS, such as a bearer channel type, bearer channel ID, and/or bearer channel protocol type. The maximum MBS capability information of the terminal refers to description information of maximum resources capable of receiving the MBS currently held by the terminal, such as a bandwidth and packet loss ratio, and generally refers to the equipment capability of the terminal or the sum of current unoccupied resources of the terminal. The MBS is a service flow (SF) defined by IEEE802.16d/e.

In this embodiment, if the terminal requests for joining an MBS multicast service, the terminal needs to subscribe to the MBS and obtain an MAK before joining the MBS. If the terminal requests for joining an MBS broadcast service, no authentication process is needed in the above process, and the request messages of Steps 201-203 may not carry the MBS authentication information, or the authentication information is merely used to notify nodes at the network that the terminal joins the MBS. At this time, the service authentication in Step 204 may be omitted, and no service authentication result or service authentication information needs to be delivered in subsequent steps.

A second embodiment of the present invention relates to a method for a terminal to join an MBS in a wireless network. This embodiment is approximately the same as the first embodiment, and the difference lies in that: in the first embodiment, the MBS join request message of the terminal carries an MBS zone ID for identifying the MBS to be joined; however, since there may be a plurality of MBSs in one MBS zone, the request message of the terminal not only needs to carry an MBS zone ID, but also needs to carry an MBS content ID for indicating an MBS in the MBS zone in this embodiment. Therefore, in this embodiment, existing air interface standards need to be modified to enable the DSA-REQ message to carry an MBS content ID.

A third embodiment of the present invention relates to a method for a terminal to join an MBS in a wireless network. This embodiment is approximately the same as the second embodiment, and the difference lies in that: in the second embodiment, the MBS join request message of the terminal needs to carry an MBS zone ID and a specific MBS content ID of the MBS to be joined, while this embodiment is an improvement to the second embodiment, and in this embodiment, an MBS has a unique MBS content ID globally, the service join request message only needs to carry a designated MBS content ID, so the MBS zone where the service is provided does not need to be considered. In this embodiment, existing air interface standards also need to be modified to enable the DSA-REQ message to carry an MBS content ID.

A fourth embodiment of the present invention relates to a method for a terminal to join an MBS in a wireless network. In this embodiment, a layer-3 multicast technology is used to assist the MBS join process of the terminal, so as to enable the terminal to join a designated MBS without modifying existing air interface protocols.

Figure 3:
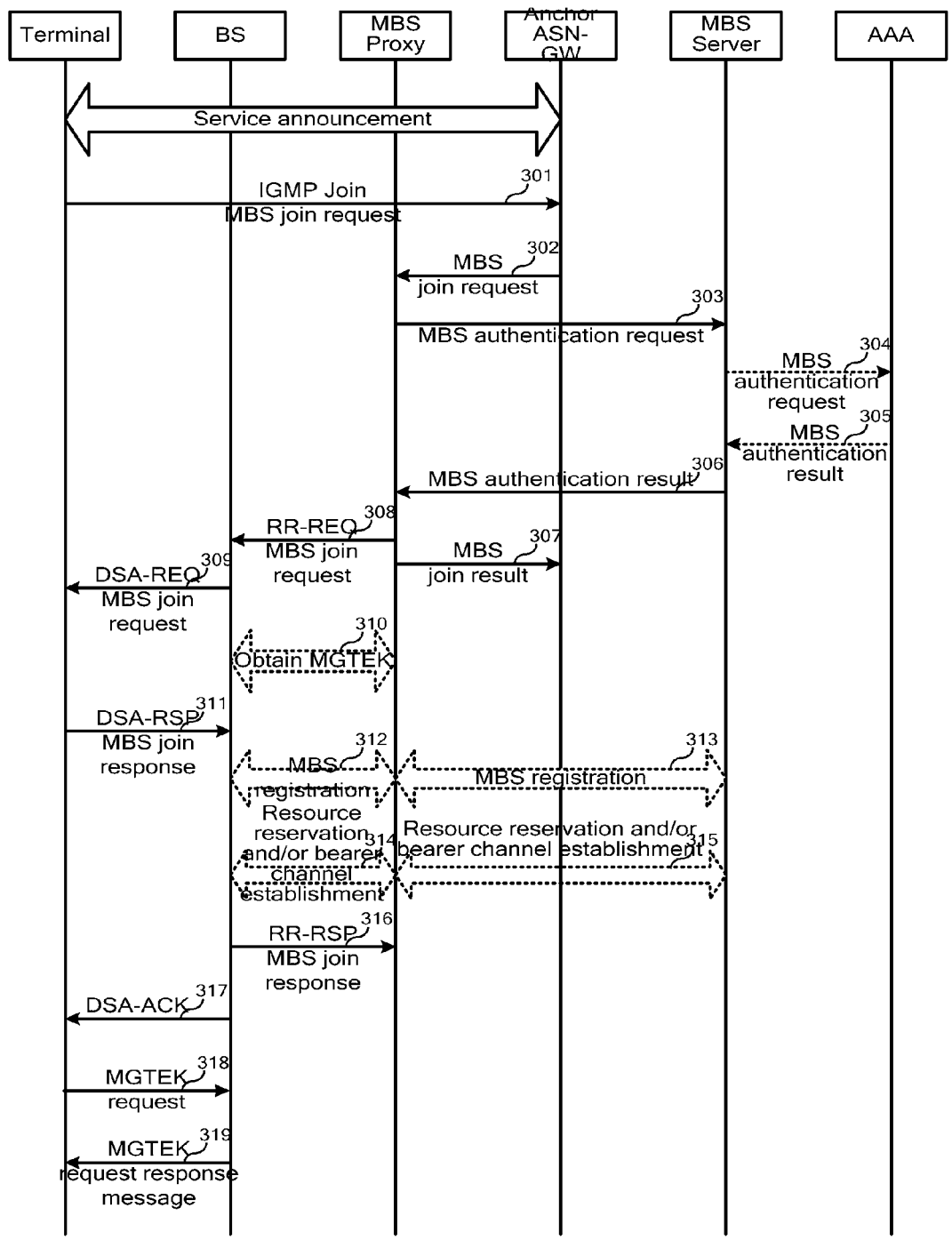
FIG. 3 is a flow chart of a method for a terminal to join an MBS in a wireless network according to a fourth embodiment of the present invention.

In this embodiment, the terminal has obtained an IP multicast address list related to the MBS of interest thereof, an MBS content ID list borne by the MBS, a corresponding relationship between IP multicast addresses and MBS content IDs, and/or MBS zones where the MBS is provided before joining the MBS. In specific applications, the terminal may obtain the above information in a service announcement phase or in other ways. If the terminal has known the MBS zones where the service is provided before initiating the MBS join process, the terminal may also know MBS zones where a current BS belongs to by detecting a DCD message broadcasted by the current BS, so as to determine whether the terminal is currently located in an MBS zone where the MBS of interest thereof is provided. If not, the join process does not need to be initiated. Referring to FIG. 3, the method includes the following steps.

In Step 301, the terminal sends an MBS join request IGMP Join to an anchor ASN-GW. The message carries an IP multicast address to be added and/or service authentication information. The message may be borne by an initial service flow (ISF) channel of the terminal.

In Step 302, after receiving the MBS join request of the terminal, the anchor ASN-GW sends an MBS join request to an MBS proxy. The request carries a terminal ID MSID and the IP multicast address to be added by the terminal and/or service authentication information.

In Step 303, after receiving the MBS join request, the MBS proxy sends an MBS authentication request to an MBS server to request to determine whether the terminal has the right to receive the MBS. The request may also carry an NAI of the terminal, an IP multicast address, and/or an MBS content ID. This step also has the following circumstances.

a) If the MBS proxy or a certain functional entity such as an SFA in the ASN-GW of the MBS proxy has stored MBS authorization information, that is, the MBS proxy is capable of performing MBS authorization, the MBS proxy does not need to send the MBS authentication request to the MBS server, and can simply process the MBS join request of the corresponding terminal according to the stored MBS authorization information.

b) If a bearer channel for transmitting the MBS between the ASN-GW and the MBS server is not pre-configured and no corresponding bearer channel has been established, the MBS authentication request sent by the MBS proxy to the MBS server further contains a bearer channel establishment request requesting for establishing a bearer channel for transmitting the MBS on the ASN-GW and the MBS server. The bearer channel between the ASN-GW and the MBS server may be realized through tunneling technologies such as GRE, L2TP, VLAN, MPLS, and IPSec, or through IP multicast technologies such as IGMP and MLD.

In Step 304, after the MBS server receives the MBS authentication request, if the MBS server stores the MBS authorization information of the terminal, the MBS server retrieves the MBS authorization information and determines whether the terminal is capable of using the MBS. If the MBS server does not store the corresponding authorization information and cannot determine whether the terminal is capable of using the MBS, the MBS server also needs to request an AAA server of the terminal to perform an MBS authentication.

In Step 305, the AAA server determines whether the terminal is capable of using the MBS according to the user subscription information and the service policy, and notifies a service authentication result to the MBS server. At this time, optionally, the AAA server may also deliver the MBS authorization information of the terminal to the MBS server, so as to enable the MBS server to directly process the received MBS authentication request of the terminal in subsequent processes.

In Step 306, the MBS server returns the MBS authentication result to the MBS proxy. Meanwhile, optionally, the MBS server may deliver the MBS authorization information of the terminal to the MBS proxy or a certain functional entity such as the SFA in the ASN-GW of the MBS proxy, so as to enable the MBS proxy to directly process the received MBS join request of the terminal in subsequent processes. In addition, this step may also have the following circumstances.

a) Optionally, if a range of providing the MBS is dynamically established and no terminal within the ASN or MBS zone has received the MBS, the MBS server may directly update a downlink providing list of the MBS after the MBS authentication is passed, that is, add an ID or an IP address of the ASN-GW or the MBS proxy into the downlink providing list of the MBS.

b) Optionally, after the MBS authentication is passed, the MBS server updates statistics of user number of the MBS, so as to determine an actual number of users using the MBS.

c) Optionally, if the ASN-GW and/or the MBS proxy do not know the resource reservation information and/or bearer channel information required by the MBS, in this step, the MBS server may concurrently deliver the resource reservation information and/or bearer channel information required by the MBS.

d) Corresponding to Step 303 b), the MBS server determines whether to accept the bearer channel establishment request according to a resource condition and a service policy thereof and returns a bearer channel establishment result to the MBS proxy in this step.

After the MBS proxy receives the MBS authentication result from the MBS server, Step 307 or Step 308 is performed. Here, the sequence for performing Step 307 and Step 308 is not specified.

In Step 307, the MBS proxy returns a result of the MBS join request to the anchor ASN-GW according to the authentication result.

In Step 308, the MBS proxy sends an MBS join request such as an RR-REQ to the BS according to the authentication result. This step may also have the following circumstances.

a) If resources for bearing the MBS between the BS and the ASN-GW are not pre-configured and no corresponding resources have been reserved (that is, the BS has not sent the RR-REQ in previous steps), a response message to the MBS join of the terminal sent by the MBS proxy to the BS further contains the RR-REQ requesting for corresponding bearer resources for bearing the MBS on the BS and the ASN-GW.

b) If a bearer channel for transmitting the MBS between the BS and the ASN-GW is not pre-configured and no corresponding bearer channel has been established (that is, the BS has not sent the bearer channel establishment request in previous steps), the response message to the MBS join of the terminal sent by the MBS proxy to the BS further contains a bearer channel establishment request requesting for establishing a bearer channel for transmitting the MBS on the BS and the ASN-GW. The bearer channel between the BS and the ASN-GW may be realized through tunneling technologies such as GRE, VLAN, and MPLS.

c) Optionally, if the range of providing the MBS is dynamically established and no terminal within the BS has received the MBS, the MBS proxy may directly update the downlink providing list of the MBS after the MBS authentication is passed, that is, to add a BSID into the downlink providing list of the MBS.

d) Optionally, the MBS proxy updates statistics of the user number of the MBS after the MBS authentication is passed, so that the ASN-GW or the MBS proxy can determine the number of users using the MBS within the coverage of the BS and thus know the number of users using the MBS within the ASN or MBS zone.

In Step 309, after the BS receives a response to the MBS join request, if the response is a success response, the BS sends an MBS join request message DSA-REQ to the terminal. The message carries one or more of an MBS zone ID, an air interface CID or an air interface MCID, all MBS content IDs borne by the CID or MCID, a GSA ID or a Unicast Security Association ID, and MBS QoS parameters corresponding to the MBS to be joined.

Optionally, in Step 310, if the BS decides to transmit the MBS in a link-layer multicast mode and the MBS is not a broadcast service, the BS also needs to obtain an MGTEK. The key is used to generate an MTK of the MBS for air interface transmission.

The BS may send an MGTEK request message to the ASN-GW to request the ASN-GW to deliver the MGTEK generated by the ASN-GW to the BS. If the ASN-GW has not generated the MGTEK for the MBS, the ASN-GW firstly generates an MGTEK for the MBS and then delivers the generated MGTEK to the BS.

If the BS already has an MGTEK or can generate the MGTEK, this step is omitted, or the BS is triggered to generate the MGTEK in this step.

The sequence for performing this step and Step 309 is not specified.

Then, Step 311 is performed. In this step, after receiving the DSA-REQ message from the BS, the terminal determines whether the terminal is capable of normally receiving the MBS according to QoS parameter requirements of the MBS and a maximum MBS capability of the terminal. If the terminal is capable of normally receiving the MBS, the terminal stores a corresponding MBS context. The terminal returns an MBS join response message DSA-RSP to the BS. The message carries an MBS join result.

Optionally, in Step 312, if the range of providing the MBS is dynamically established, and no terminal within the BS has received the MBS, that is, the BS has never registered the MBS with the MBS proxy, the BS initiates a service registration to the MBS proxy, so as to update the downlink providing list of the MBS in the ASN-GW, that is, to add the BSID into the downlink providing list of the MBS.

Likewise, optionally, in Step 313, after the MBS proxy updates the downlink providing list of the MBS in the ASN-GW, if no terminal within the ASN or MBS zone has received the MBS, that is, the MBS proxy has not registered the MBS with the MBS server, the MBS proxy registers the MBS with the MBS server in this step, so as to update the downlink providing list of the MBS in the MBS server, that is, to add the ID or the IP address of the ASN-GW or the MBS proxy into the downlink providing list of the MBS in the MBS server.

Optionally, in this step, if no bearer channel for transmitting the MBS between the ASN-GW/MBS proxy and the MBS server has been established and/or no resources have been reserved, and no corresponding resource reservation information and/or bearer channel information has been delivered, the MBS server delivers the resource reservation information and/or bearer channel establishment information when responding to the registration request of the ASN-GW. After receiving the resource reservation information and/or bearer channel establishment information, the ASN-GW further delivers the resource reservation information and/or bearer channel information of the MBS to the BS when responding to the registration request of the BS.

Optionally, in Step 314, if the bearer channel and/or reserved resources for transmitting the MBS between the BS and the ASN-GW are not pre-configured, and in previous steps, the BS has not sent the corresponding RR-REQ and/or bearer channel establishment request and the ASN-GW or the MBS proxy has not actively initiated the RR-REQ and/or bearer channel establishment request, the BS sends an RR-REQ and/or a bearer channel establishment request to the ASN-GW in this step to reserve resources and/or establish a corresponding bearer channel for transmitting the MBS between the BS and the ASN-GW.

Optionally, in Step 315, after receiving the RR-REQ and/or bearer channel establishment request from the BS, the ASN-GW or the MBS proxy may determine whether to perform the corresponding resource reservation and/or establish the corresponding bearer channel according to a network resource condition. In addition, if the bearer channel and/or reserved resources for transmitting the MBS between the ASN-GW and the MBS server are not pre-configured, and no corresponding RR-REQ and/or bearer channel establishment request have been sent to the MBS server in previous steps, the MBS proxy sends an RR-REQ and/or a bearer channel establishment request to the MBS server in this step to reserve resources and/or establish a corresponding bearer channel for transmitting the MBS between the ASN-GW and the MBS server.

In Step 316, the BS sends a response to the MBS join request of the terminal to the MBS proxy or a serving ASN-GW. This step may also have the following circumstances.

a) If in Step 308 a), the response message to the MBS join of the terminal sent by the MBS proxy to the BS further contains an RR-REQ, the BS determines whether to accept the RR-REQ according to an air interface resource condition and an admission control policy in this step. If yes, the BS reserves corresponding resources. In this step, the BS returns a resource reservation result to the MBS proxy.

b) If in Step 308 b), the response message to the MBS join of the terminal sent by the MBS proxy to the BS further contains a bearer channel establishment request, the BS determines whether to accept the bearer channel establishment request according to the air interface resource condition and the admission control policy in this step. If yes, the BS establishes a corresponding bearer channel. In this step, the BS returns a bearer channel establishment result to the MBS proxy.

In Step 317, after receiving the MBS join response message DSA-RSP, the BS sends an MBS join acknowledgement message DSA-ACK to the terminal to acknowledge that the process has been completed.

In Step 318, after obtaining the GSA ID, the terminal initiates a key request message to the BS to request the MGTEK of the MBS. The request message carries the GSA ID of the MBS.

In Step 319, after receiving the request, the BS sends the MGTEK generated or obtained previously to the terminal. The terminal generates an MTK according to a MAK obtained previously and the MGTEK, and receives a corresponding MBS according to MBS parameters obtained from the network.

In this embodiment, if the terminal requests for joining an MBS multicast service, the terminal needs to subscribe to the MBS and obtain the MAK before joining the MBS. If the terminal requests for joining an MBS broadcast service, no authentication process is needed in the above process, and the request messages of Steps 301-303 may not carry the MBS authentication information, or the authentication information is merely used to notify nodes at the network that the terminal joins the MBS. At this time, the service authentication in Step 304 may be omitted, and no service authentication result or service authentication information needs to be delivered in subsequent steps.

A fifth embodiment of the present invention relates to a method for a terminal to join an MBS in a wireless network. This embodiment is approximately the same as the fourth embodiment, and the difference lies in that: in the fourth embodiment, the terminal has obtained a corresponding relationship between IP multicast addresses and MBS content IDs before initiating an MBS join process; in this embodiment, the terminal has not obtained the corresponding relationship between IP multicast addresses and MBS content IDs before joining the MBS, and the corresponding relationship is notified by the network to the terminal during the MBS join process of the terminal. For example, an MS notifies the network an IP multicast group that the MS intends to join through an IGMP Join message, and the network returns an air interface DSA message that carries an MBS content ID list corresponding to the IP multicast group.

Figure 4:
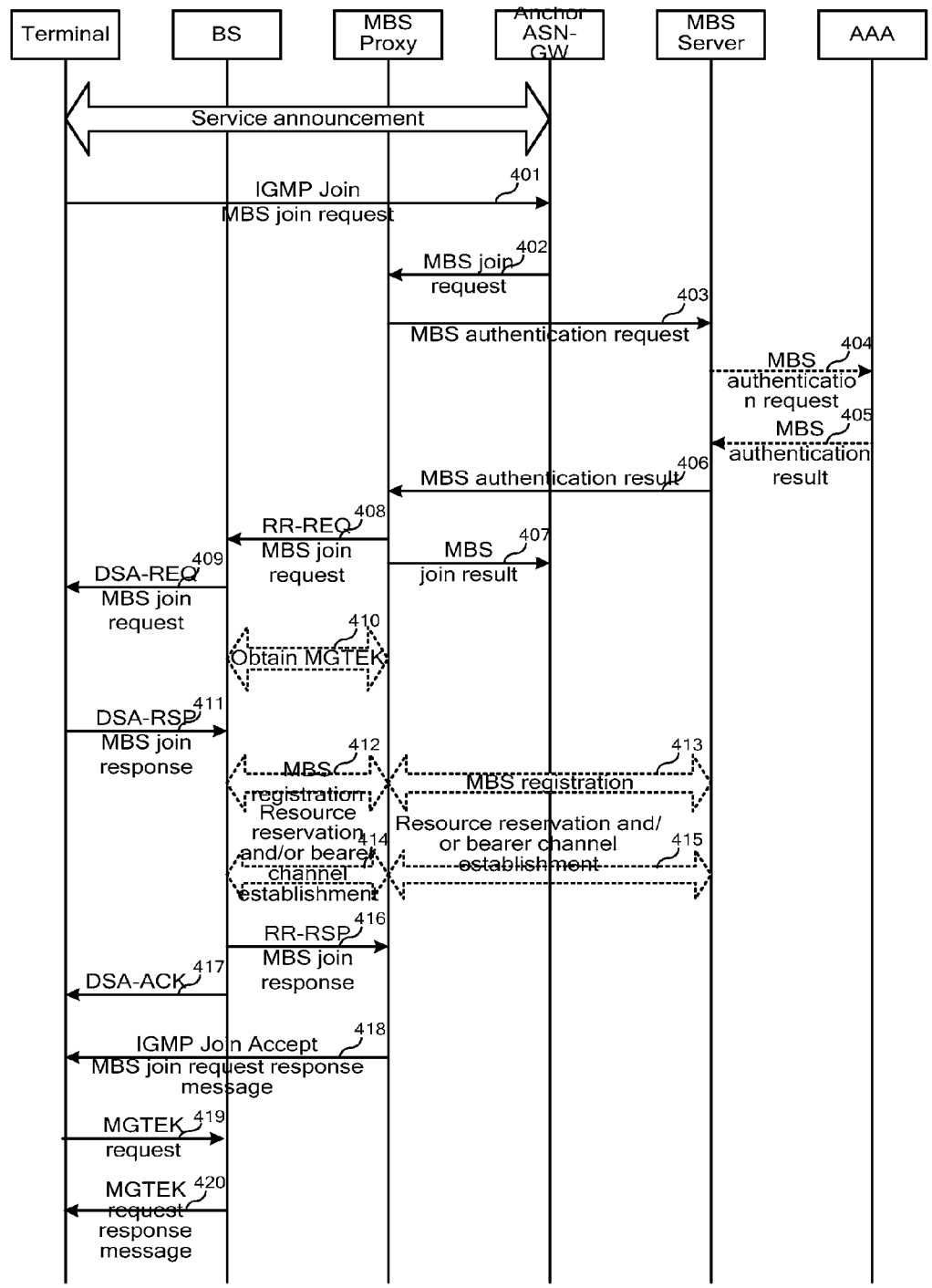
FIG. 4 is a flow chart of a method for a terminal to join an MBS in a wireless network according to a fifth embodiment of the present invention.

Referring to FIG. 4, the method includes the following steps. Steps 401-417 are similar to Steps 301-317, and the details will not be described herein again.

In Step 418, after receiving an MBS join result sent by the BS, the MBS proxy/serving ASN-GW sends an MBS content ID list corresponding to the added IP multicast address to the terminal. The message may also carry one or more of an MBS zone ID, an air interface CID or an air interface MCID, all MBS content IDs borne by the CID or MCID, a GSA ID, and a Unicast Security Association ID corresponding to the MBS to be joined.

The sequence for performing this step and Step 417 is not specified.

Step 419 and Step 420 are similar to Step 318 and Step 319.

Figure 5:
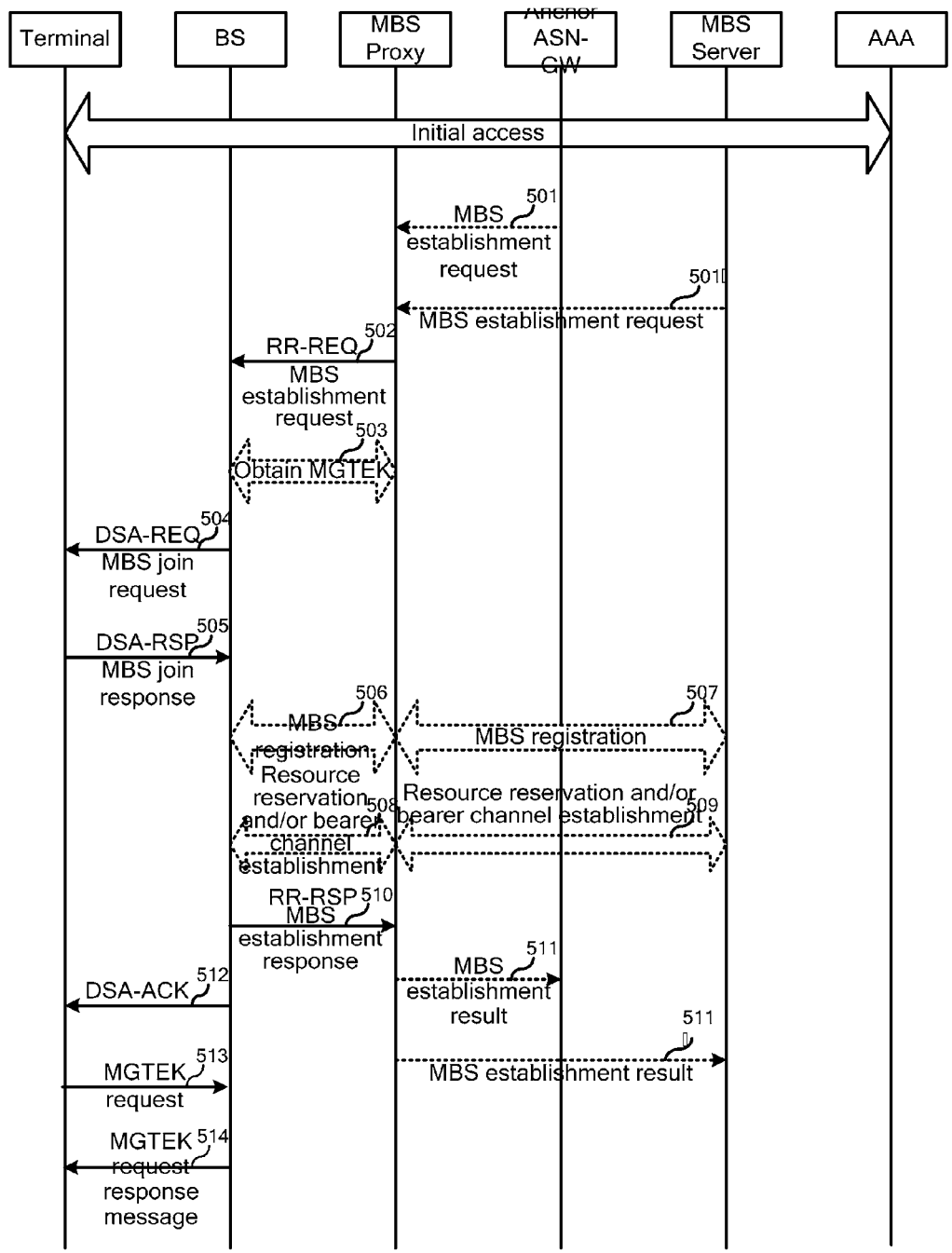
FIG. 5 is a flow chart of a method for a terminal to join an MBS in a wireless network according to a sixth embodiment of the present invention.

A sixth embodiment of the present invention relates to a method for a terminal to join an MBS in a wireless network. In this embodiment, the network actively initiates an MBS join process during establishing a preset flow after the terminal accesses the network or when a network entity requires dynamically establishing an MBS. For a multicast service, before the network requests the terminal to join the MBS, the terminal needs to subscribe to the MBS and obtain an MAK of the MBS first. Subscription information may be contained in a user subscription message. Referring to FIG. 5, the method includes the following steps.

In this embodiment, an MBS establishment request sent by the network entity has the following possibilities.

If the terminal is in an initial phase after accessing the network and the user subscription message has been delivered to an access network entity anchor ASN-GW, the anchor ASN-GW or a functional entity such as an SFA in the anchor ASN-GW initiates an MBS establishment request to an MBS proxy in Step 501. The request also needs to carry a terminal ID MSID.

Alternatively, in Step 501', the MBS server sends an MBS establishment request to the MBS proxy. The message carries an NAI or an MSID. This step may also include the following options.

a) Optionally, if a range of providing the MBS is dynamically established and no terminal within the ASN or MBS zone has received the MBS, the MBS server may directly update a downlink providing list of the MBS, that is, add an ID or an IP address of the ASN-GW or the MBS proxy into the downlink providing list of the MBS.
  b) Optionally, the MBS server may update statistics of user number of the MBS, so as to determine the actual number of users currently using the MBS.

In Step 502, if the MBS proxy has obtained the user subscription message during an access authentication phase of the terminal, the MBS proxy may directly trigger an MBS establishment request; or after receiving an MBS establishment request from the MBS server or the anchor ASN-GW, the MBS proxy further initiates the MBS establishment request to the BS. If the MBS is transmitted in an IP layer by using an IP multicast technology, the MBS proxy also needs to notify a corresponding multicast router (MR) to add the terminal to a corresponding multicast group.

Moreover, this step may also include the following options.
  a) Optionally, if the range of providing the MBS is dynamically established and no terminal within the BS has received the MBS, the MBS proxy may directly update the downlink providing list of the MBS, that is, add a BSID into the downlink providing list of the MBS.
  b) Optionally, the MBS proxy updates statistics of the user number of the MBS, so that the ASN-GW or the MBS proxy can determine the number of users using the MBS within the coverage of the BS and thus know the number of users using the MBS within the ASN or MBS zone.
  c) If resources for bearing the MBS between the ASN-GW and the BS are not pre-configured and no corresponding resources have been reserved, the MBS establishment request sent by the MBS proxy to the BS may also contain an RR-REQ requesting corresponding bearer resources to bear the MBS on the BS and the ASN-GW.
  d) If a bearer channel for transmitting the MBS between the BS and the ASN-GW is not pre-configured and no corresponding bearer channel has been established, a request message for the terminal to join the MBS, which is sent by the MBS proxy to the BS, further contains a bearer channel establishment request requesting for establishing a bearer channel for transmitting the MBS on the BS and the ASN-GW. The bearer channel between the BS and the ASN-GW may be realized through tunneling technologies such as GRE, VLAN, and MPLS.

Optionally, in Step 503, if the BS transmits the MBS in a link-layer multicast mode and the MBS is not a broadcast service, the BS requests the MBS proxy for an MGTEK. The key is used to generate an MTK of the MBS for air interface transmission.

The BS may send an MGTEK key request message to the ASN-GW to request the ASN-GW to deliver an MGTEK generated by the ASN-GW to the BS. If the ASN-GW has not generated the MGTEK for the MBS, the ASN-GW firstly generates an MGTEK for the MBS and then delivers the generated MGTEK to the BS.

If the BS already has the MGTEK or can generate the MGTEK, this step is omitted, or the BS is triggered to generate the MGTEK in this step.

In Step 504, the BS sends an MBS join request message DSA-REQ to the terminal. The message carries one or more of an MBS zone ID, an air interface CID or an air interface MCID, all MBS content IDs borne by the CID or MCID, a GSA ID or a Unicast Security Association ID, and MBS QoS parameters corresponding to the MBS to be joined.

In Step 505, after receiving the DSA-REQ message, the terminal determines whether the terminal is capable of normally receiving the MBS according to QoS parameter requirements of the MBS and a maximum MBS capability of the terminal. If yes, the terminal stores a corresponding MBS context. The terminal returns an MBS join response message DSA-RSP to the BS. The message carries an MBS join result.

Optionally, in Step 506, if the range of providing the MBS is dynamically established, and no terminal within the BS has received the MBS, that is, the BS has not registered the MBS with the MBS proxy, the BS initiates a registration to the ASN-GW, so as to update the downlink providing list of the MBS, that is, to add the BSID into the downlink providing list of the MBS in the ASN-GW.

Likewise, optionally, in Step 507, after the MBS proxy updates the downlink providing list of the MBS in the ASN-GW, if no terminal within the ASN or MBS zone has received the MBS, that is, the MBS proxy has not registered the MBS with the MBS server, the MBS proxy registers the MBS to the MBS server in this step, so as to update a downlink providing list of the MBS in the MBS server, that is, to add the ID or the IP address of the ASN-GW or the MBS proxy into the downlink providing list of the MBS in the MBS server.

Optionally, in this step, if no bearer channel for transmitting the MBS between the ASN-GW/MBS proxy and the MBS server has been established and/or no resources have been reserved, and no corresponding resource reservation information and/or bearer channel information has been delivered, the MBS server delivers the resource reservation information and/or bearer channel establishment information while responding to the registration request of the ASN-GW. After receiving the resource reservation information and/or bearer channel establishment information, the ASN-GW further delivers the resource reservation information and/or bearer channel information of the MBS to the BS when responding to the registration request of the BS.

Optionally, in Step 508, if the bearer channel and/or reserved resources for transmitting the MBS between the BS and the ASN-GW are not pre-configured, no corresponding resources have been reserved and/or no corresponding bearer channel has been established, and the MBS establishment request sent by the MBS proxy to the BS in Step 502 does not contain the RR-REQ and/or bearer channel establishment request, the BS sends an RR-REQ and/or a bearer channel establishment request to the ASN-GW or the MBS proxy in this step to reserve resources and/or establish a corresponding bearer channel for transmitting the MBS between the BS and the ASN-GW.

Optionally, in Step 509, after receiving the RR-REQ and/or bearer channel establishment request from the BS, the ASN-GW or the MBS proxy may determine whether to perform the resource reservation and/or establish the bearer channel according to an air interface resource condition. In addition, if the bearer channel and/or reserved resources for transmitting the MBS between the ASN-GW and the MBS server are not pre-configured, and no corresponding resources have been reserved and/or no corresponding bearer channel has been established, the ASN-GW or the MBS proxy sends an RR-REQ and/or a bearer channel establishment request to the MBS server to reserve resources and/or establish a corresponding bearer channel for transmitting the MBS between the ASN-GW and the MBS server.

In Step 510, after receiving the DSA-RSP message, the BS returns a result of the MBS join request to the MBS proxy specifically through, for example, a response message RR-RSP. In addition, this step may also have the following circumstances.

a) Corresponding to Step 502 a), if the MBS establishment request message sent by the MBS proxy to the BS does not contain the RR-REQ, the BS determines whether to accept the RR-REQ according to an air interface resource condition and an admission control policy in this step. If yes, the BS reserves corresponding resources. In this step, the BS also returns a resource reservation result to the ASN-GW.

b) Corresponding to Step 502 b), if the MBS establishment request message sent by the MBS proxy to the BS does not contain the bearer channel establishment request, the BS determines whether to accept the bearer channel establishment request according to the air interface resource condition and the admission control policy in this step. If yes, the BS establishes a corresponding bearer channel. In this step, the BS also returns a bearer channel establishment result to the ASN-GW.

After obtaining an MBS establishment result, the MBS proxy notifies the initiator of the MBS establishment request. If the initiator of the MBS establishment request is the anchor ASN-GW, that is, corresponding to Step 501 and Step 501', Step 511 is performed. In this step, the MBS proxy returns the service establishment result to the anchor ASN-GW. If the initiator of the MBS establishment request is the MBS server, that is, corresponding to Step 501', Step 511' is performed. In this step, the MBS proxy returns the service establishment result to the MBS server. If the initiator of the MBS establishment request is the MBS proxy, this step may be omitted.

In Step 512, after receiving the MBS join response message DSA-RSP, the BS sends an MBS join acknowledgement message DSA-ACK to the terminal to acknowledge that the service join process has been completed.

In Step 513, after obtaining the GSA ID, the terminal initiates a key request message to the BS to request the MGTEK of the MBS. The request message carries the GSA ID of the MBS.

In Step 514, after receiving the request, the BS sends the MGTEK generated or obtained previously to the terminal. The terminal generates an MTK according to an MAK obtained previously and the MGTEK, and receives a corresponding MBS according to MBS parameters obtained from the network.

It should be noted that, in the above embodiments, the entities may be independent from one another or be integrated in one functional entity. When the entities are in one physical entity, the entities interact with one another through internal primitives. For example, the ASN-GW and BS may be the same physical entity, the anchor ASN-GW and the serving ASN-GW may be the same physical entity, and the MBS proxy and the ASN-GW may be the same physical entity.

The MBS proxy is a functional entity within the ASN or MBS zone that processes MBS signaling and/or service for the terminal. In the above embodiments, this functional entity may be located in the anchor ASN-GW or the serving ASN-GW, and may also independently exist within the MBS zone. When the MBS proxy is located in the anchor ASN-GW, the message interaction between the MBS proxy and the anchor ASN-GW is implemented through internal primitives.

It can be seen that in the embodiments of the present invention, the terminal can obtain an MAK and a context thereof from an MBS network, and obtain MBS parameters and a MGTEK from a bearer network, and can successfully receive corresponding MBS data on a bearer indicated by the MBS parameters according to an MTK generated from the MAK and the MGTEK through the obtained information.

In particular, two methods may be used by the terminal to obtain the MAK and the context thereof and/or an MBS ID (including one or any combination of an IP multicast address and/or a port number, an MBS content ID, an authorization token, and an MBS zone ID) from the MBS network. In the first method, the terminal actively requests the MBS network to deliver the MAK and the context thereof and/or the MBS ID. Alternatively, when a condition is satisfied, the MBS network is automatically triggered to deliver the MAK and the context thereof and/or the MBS ID.

For example, if the network has completed the configuration of the MBS when the terminal accesses the network, the terminal may directly trigger the MBS network to deliver the MAK and the context thereof and/or the MBS ID after accessing the network. If the network has not completed the resource configuration of the MBS when the terminal accesses the network, the network triggers the MBS network to deliver the MAK and the context thereof and/or the MBS ID after completing the resource configuration of the MBS after the terminal accesses the network.

The process of the terminal requesting the network to deliver the MAK and the context thereof and/or the MBS ID is as follows.

(1) The terminal sends an MBS request message to the MBS network. The MBS request and response messages may be borne on the http protocol.

(2) After receiving the request, the service network authenticates the MBS requested by the terminal. If the authentication is passed, the service network delivers the MAK and the context thereof and/or the MBS ID. The MBS may be identified by the following information: an IP multicast address and/or a port number, and/or an MBS content ID, and/or an authorization token, and/or an MBS zone ID. The authorization token is an ID assigned by an application layer to a certain MBS, and may identify an MBS and QoS parameters thereof, for authorizing QoS of one or more IP flows generated in an application layer service flow establishment or modification process.

The process of the MBS network actively delivering the MAK and the context thereof and/or the MBS ID is as follows.

When a preset condition is satisfied, for example, the terminal accesses the network, the network has completed the resource configuration of the MBS, or the MBS network is triggered by the bearer network, the MBS network is automatically triggered to deliver the MAK and the context thereof and/or the MBS ID to the terminal so as to authorize the terminal to join the MBS. The terminal may be a terminal that passes the MBS authentication.

The terminal may obtain the multicast parameters and the MGTEK of the MBS from the bearer network during an MBS join process initiated by the terminal or that initiated by the network.

It can be seen that in the embodiments of the present invention, the terminal initiates an MBS join process by sending an MBS join request, or initiates the MBS join process from the network. During the MBS join process, the terminal obtains MBS parameters that include a first ID indicating an air interface connection and a second ID indicating MBS content from the network, so that the terminal can receive the MBS content indicated by the second ID from the air interface connection indicated by the first ID after receiving the MBS parameters and thus successfully join the MBS.

The terminal may initiate an MBS join process by sending an MBS join request message, so as to obtain the MBS parameters and join the required MBS. The network may also actively initiate the MBS join process to send the MBS parameters to the terminal and invite the terminal to join the MBS. Therefore, both the network and the terminal side can actively operate according to actual requirements.

The terminal may send an MBS request message through a DSA process. The message carries an MBS zone ID for informing the network of the MBS that the terminal intends to add. Since there may be a plurality of MBSs in one MBS zone, for clear identification, the message may also carry an MBS content ID for uniquely indicating the MBS to be joined, so that the terminal does not need to join other MBSs in the same MBS zone at the same time. In addition, if the MBS content ID is unique globally, the message may also only carry an MBS content ID.

Alternatively, the terminal may send the MBS request through an IGMP protocol message. The message carries an IP multicast address that also can clearly inform the network of the MBS that the terminal intends to add.

At the network, the MBS server may interact with the AAA server to perform an MBS authentication on the terminal, or the ASN-GW/MBS proxy performs the MBS authentication on the terminal according to the authentication result obtained previously. Through the MBS authentication, it is ensured that the terminal that joins the MBS has subscribed to the MBS and is authorized for the MBS, so as to prevent invalid users from obtaining relevant services and safeguard the rights and interests of valid users.

The network or the terminal compares the maximum capability of the terminal with minimum requirements of the MBS to determine whether the terminal is capable of bearing the MBS, so as to prevent the terminal from receiving the service when the terminal is incapable, thus avoiding the waste of network resources and unnecessary loss of the terminal.

When the terminal joins the service, the BS, the ASN-GW, the MBS proxy, or the MBS server needs to re-determine the number of users using the MBS, so as to bear the MBS in a reasonable manner. If no terminal has used the MBS, the ASN-GW, the MBS proxy, or the MBS server needs to update the corresponding service providing list to ensure that the content of the providing list conforms to the actual condition.

If the resources or bearer channel for bearing the MBS between the BS and the ASN-GW or between the ASN-GW and the MBS server are not pre-configured, and no corresponding resources have been reserved and no corresponding bearer channel has been established, the BS, the ASN-GW, or the MBS server may reserve corresponding resources and/or establish a corresponding bearer channel according to resource reservation information and bearer channel information actually required by the MBS at any time before delivering the MBS parameters to the terminal.

It should be noted that, in the present invention, when the terminal in a roaming state, the MBS join of the terminal can also be achieved, which will be exemplified in the following.

Figure 6:
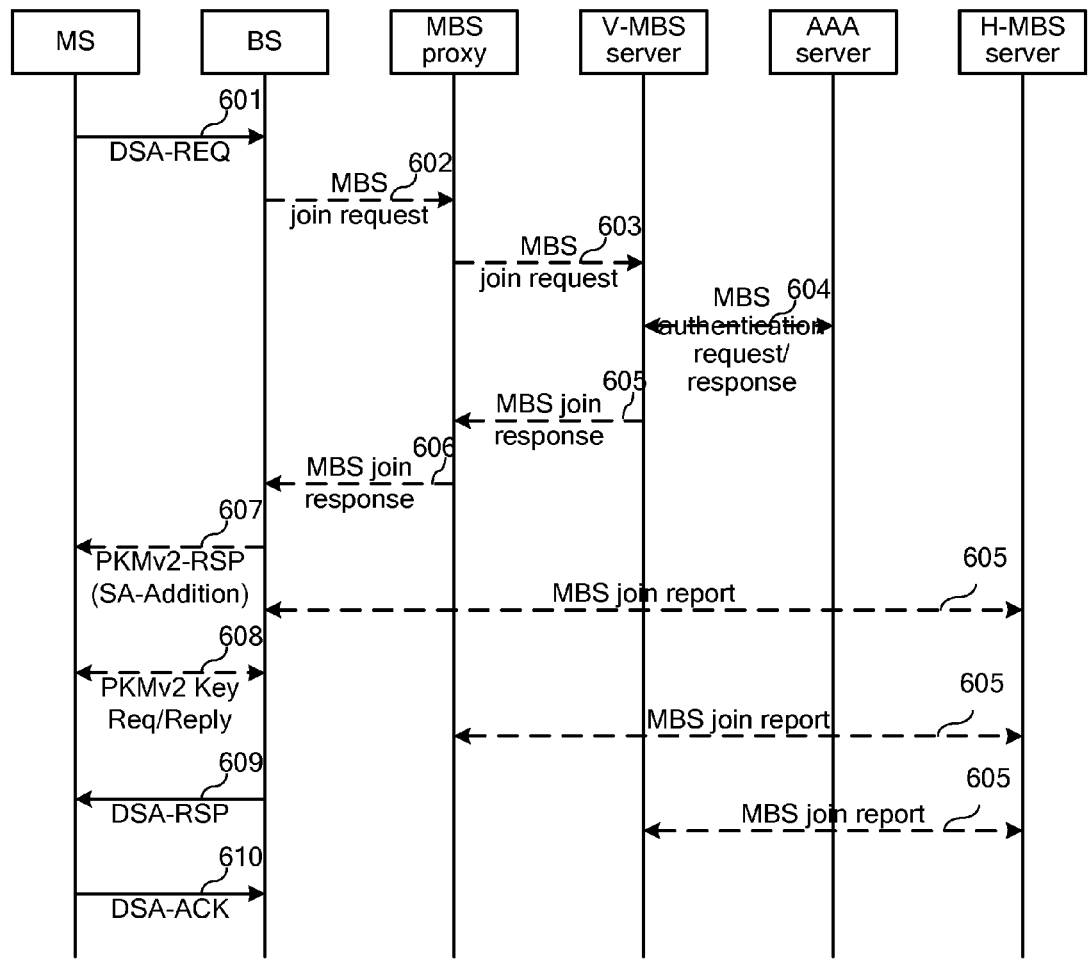
FIG. 6 is a flow chart of a method for a terminal to join an MBS in a wireless network according to a seventh embodiment of the present invention.

A seventh embodiment of the present invention relates to a method for a terminal to join an MBS in a wireless network. Referring to FIG. 6, the method includes the following steps.

In Step 601, a terminal sends a DSA-REQ message to a BS through an air interface to request to join an MBS. The message carries an MBS ID of the requested MBS. The MBS ID may be an IP multicast address/port number, and/or an MBS content ID, and/or an authorization token, and/or an MBS zone ID.

In Step 602, after receiving the DSA-REQ message, the BS performs a bearer authentication. The BS sends an MBS join request message to an MBS proxy. The message carries a user ID (for example, terminal ID), an MBS ID of the requested MBS, and/or a multicast indication. If the BS has known an MBS authentication result of the terminal, Step 607 may be directly performed. For a roaming scenario, Step 605' also needs to be performed.

In Step 603, after receiving the request, the MBS proxy sends an MBS join request message to a visiting MBS (V-MBS) server. The message carries a user ID (for example, NAI) and an MBS ID of the requested MBS. If the MBS proxy has known the MBS authentication result of the terminal, Step 606 may be directly performed. For the roaming scenario, Step 605' also needs to be performed.

In Step 604, after receiving the request, the V-MBS server may interact with an AAA server to perform an MBS authentication and/or user authentication on the terminal, or determine whether the MBS requested by the terminal has passed an authorization. If the authentication/authorization is passed, the AAA server may set an MBS activation indication of the terminal. If the MBS server has known the MBS authentication result of the terminal, Step 605 may be directly performed.

In Step 605, the V-MBS server makes a decision according to the MBS authentication result of the terminal and then sends an MBS join response message to the MBS proxy. The message carries a user ID (for example, NAI), a policy result, and an MBS ID. If the authorization is passed, the MBS server may add the terminal into a multicast user group of the corresponding multicast service.

For the roaming scenario, Step 605' is then performed. In this step, the BS, the MBS proxy, or the V-MBS server may optionally send an MBS join report message of the terminal to a home MBS (H-MBS) server and/or a home AAA (H-AAA) server to notify the H-MBS server and/or the H-AAA server that the terminal joins the multicast service, so as to support the accounting. If the V-MBS server and the H-MBS server cannot directly communicate with each other, they need to communicate through the V-AAA server and the H-AAA server.

In Step 606, the MBS proxy sends an MBS join response message to the BS. The message carries a user ID (for example, terminal ID), a policy result, and an MBS ID.

In Step 607, the BS sends a PKMv2-RSP message (that is, SA-Adding, for notifying an MBS GSA used by the terminal) to the terminal to inform the terminal of SA information corresponding to the MBS. The carried parameters include an MBS GSA ID, an SA-type, an SA service type, and a cryptographic-suite. Then, Step 608 is performed.

If the network has completed the network resource configuration of the MBS multicast service when the terminal accesses the network, the parameters transferred in Step 607 may also be delivered to the terminal through the PKMv2-RSP (SA-TEK-Challenge) message when the terminal initially accesses the network. At this time, Step 607 may be omitted, and Step 608 may be performed at any time after the terminal passes the MBS authentication.

In Step 608, the BS and the terminal exchange a "PKMv2 Key Req"/"PKMv2 Key Reply" message through the air interface so as to inform the terminal of an MBS security key (such as an MGTEK and/or a GKEK) and a context thereof.

In Step 609, the BS sends a DSA-RSP message to the terminal so as to send parameters of the MBS that the user intends to receive to the terminal. The carried parameters include an MBS content ID, an MBS zone ID, an SFID, a Multicast CID, and QoS parameters. In this process, the bearer network may add the terminal into the multicast user group of the corresponding multicast service and/or record an MBS activation condition of the terminal.

In Step 610, the terminal sends a DSA-ACK message to the BS.

Thus, the terminal successfully obtains the MBS multicast parameters. If the terminal has obtained application layer information such as the MAK and the context thereof, the terminal can receive a corresponding MBS on a bearer indicated by the multicast parameters according to the MBS ID, the MAK, the security key, and the like. If the terminal has not obtained the MAK and the context thereof, the terminal may send a request to the MBS network to request the MAK and the context thereof.

In this embodiment, the MBS server and the MBS proxy may be combined into an MBS server. That is, the MBS server is located on the ASN-GW or located within the ASN as an independent network element. At this time, Step 603 and Step 605 may be omitted. Correspondingly, Step 605' may be performed between the ASN and the H-MBS server or the H-AAA server, or between the V-PF and the H-MBS server or the H-AAA server.

In addition, in this embodiment, the transmission path of the MBS request and response messages may also be: terminal <-> BS <-> ASN-GW <->PF <-> MBS server (<->AAA server).

Figure 7:
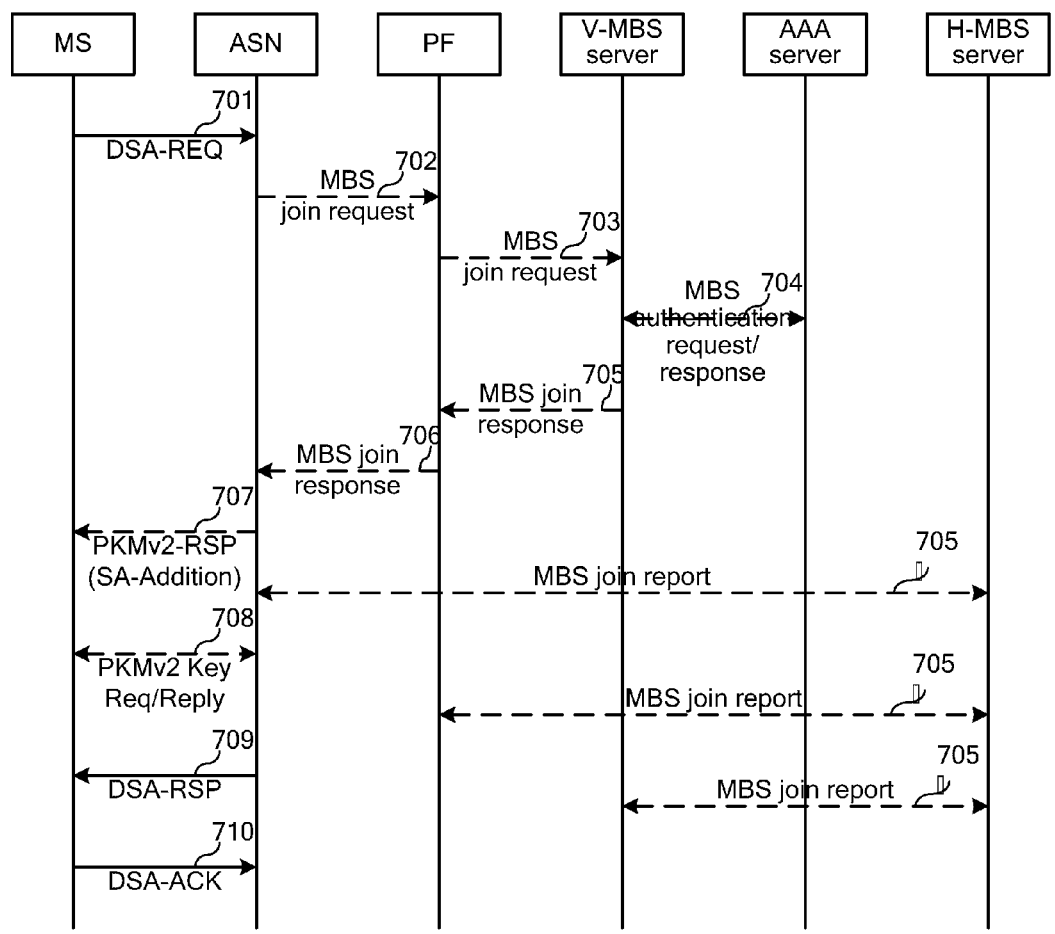
FIG. 7 is a flow chart of a method for a terminal to join an MBS in a wireless network according to an eighth embodiment of the present invention.

An eighth embodiment of the present invention relates to a method for a terminal to join an MBS in a wireless network. This embodiment is approximately the same as the seventh embodiment, and the difference only lies in that, the MBS join request message of the terminal and the corresponding response message pass through different network elements and are transmitted along different transmission paths. In this embodiment, an ASN and a Policy Function (PF) entity are used to replace the BS and the MBS proxy in the first embodiment. Referring to FIG. 7, the method includes the following steps.

In Step 701, a terminal sends a DSA-REQ message to an ASN through an air interface to request to join an MBS. The message carries an MBS ID of the requested MBS. The MBS ID may be an IP multicast address/port number, and/or an MBS content ID, and/or an authorization token, and/or an MBS zone ID.

In Step 702, after receiving the DSA-REQ message, the ASN performs a bearer authentication. The ASN sends an MBS join request message to the PF. The message carries a user ID (for example, terminal ID), an MBS ID of the requested MBS, and/or a multicast indication. If the ASN has known an MBS authentication result of the terminal, Step 707 may be directly performed. For a roaming scenario, Step 705' also needs to be performed.

In Step 703, after receiving the request, the PF sends an MBS join request message to a V-MBS server. The message carries a user ID (for example, NAI) and an MBS ID of the requested MBS. If the PF has known the MBS authentication result of the terminal, Step 707 may be directly performed. For the roaming scenario, Step 705' also needs to be performed.

In Step 704, after receiving the request, the V-MBS server may interact with an AAA server to perform an MBS authentication and/or user authentication on the terminal, or determine whether the MBS requested by the terminal has passed an authorization. If the authentication/authorization is passed, the AAA server may set an MBS activation indication of the terminal. If the MBS server has known the MBS authentication result of the terminal, Step 705 may be directly performed.

In Step 705, the V-MBS server makes a decision according to the MBS authentication result of the terminal and then sends an MBS join response message to the PF. The message carries a user ID (for example, NAI), a policy result, and an MBS ID. If the authorization is passed, the MBS server may add the terminal into a multicast user group of the corresponding multicast service.

For the roaming scenario, Step 705' is then performed. In this step, the ASN, the PF, or the V-MBS server may optionally send an MBS join report message of the terminal to an H-MBS server and/or an H-AAA server to notify the H-MBS server and/or the H-AAA server that the terminal joins the multicast service, so as to support the accounting. If the V-MBS server and the H-MBS server cannot directly communicate with each other, they need to communicate through the V-AAA server and the H-AAA server.

In Step 706, the PF sends an MBS join response message to the ASN. The message carries a user ID (for example, terminal ID), a policy result, and an MBS ID.

In Step 707, the ASN sends a PKMv2-RSP message (that is, SA-Adding, for notifying an SA used by the terminal) to the terminal to inform the terminal of SA information corresponding to the MBS. The carried parameters include an MBS GSA ID, an SA-type, an SA service type, and a cryptographic-suite. Then, Step 708 is performed.

If the network has completed the network resource configuration of the MBS multicast service when the terminal accesses the network, the parameters transferred in Step 707 may also be delivered to the terminal through the PKMv2-RSP (SA-TEK-Challenge) message when the terminal initially accesses the network. At this time, Step 707 may be omitted, and Step 708 may be performed at any time after the terminal passes the MBS authentication.

In Step 708, the ASN and the terminal exchange a "PKMv2 Key Req"/"PKMv2 Key Reply" message through the air interface to inform the terminal of an MBS security key (such as an MGTEK and/or a GKEK) and a context thereof.

In Step 709, the ASN sends a DSA-RSP message to the terminal so as to send parameters of the MBS that the user intends to receive to the terminal. The carried parameters include an MBS content ID, an MBS zone ID, an SFID, a Multicast CID, and QoS parameters. In this process, the bearer network may add the terminal into the multicast user group of the corresponding multicast service and/or record an MBS activation condition of the terminal.

In Step 710, the terminal sends a DSA-ACK message to the ASN.

Thus, the terminal successfully obtains the MBS multicast parameters. If the terminal has obtained application layer information such as the MAK and the context thereof, the terminal can receive the corresponding MBS on a bearer indicated by the multicast parameters according to the MBS ID, the MAK, the security key, and the like. If the terminal has not obtained the MAK and the context thereof, the terminal may send a request to the MBS network to request the MAK and the context thereof.

In addition, in this embodiment, the ASN further includes a BS, a serving SFA, and an anchor SFA, and the transmission path of the messages among the functional entities is: BS <-> serving SFA <-> anchor SFA.

Figure 8:
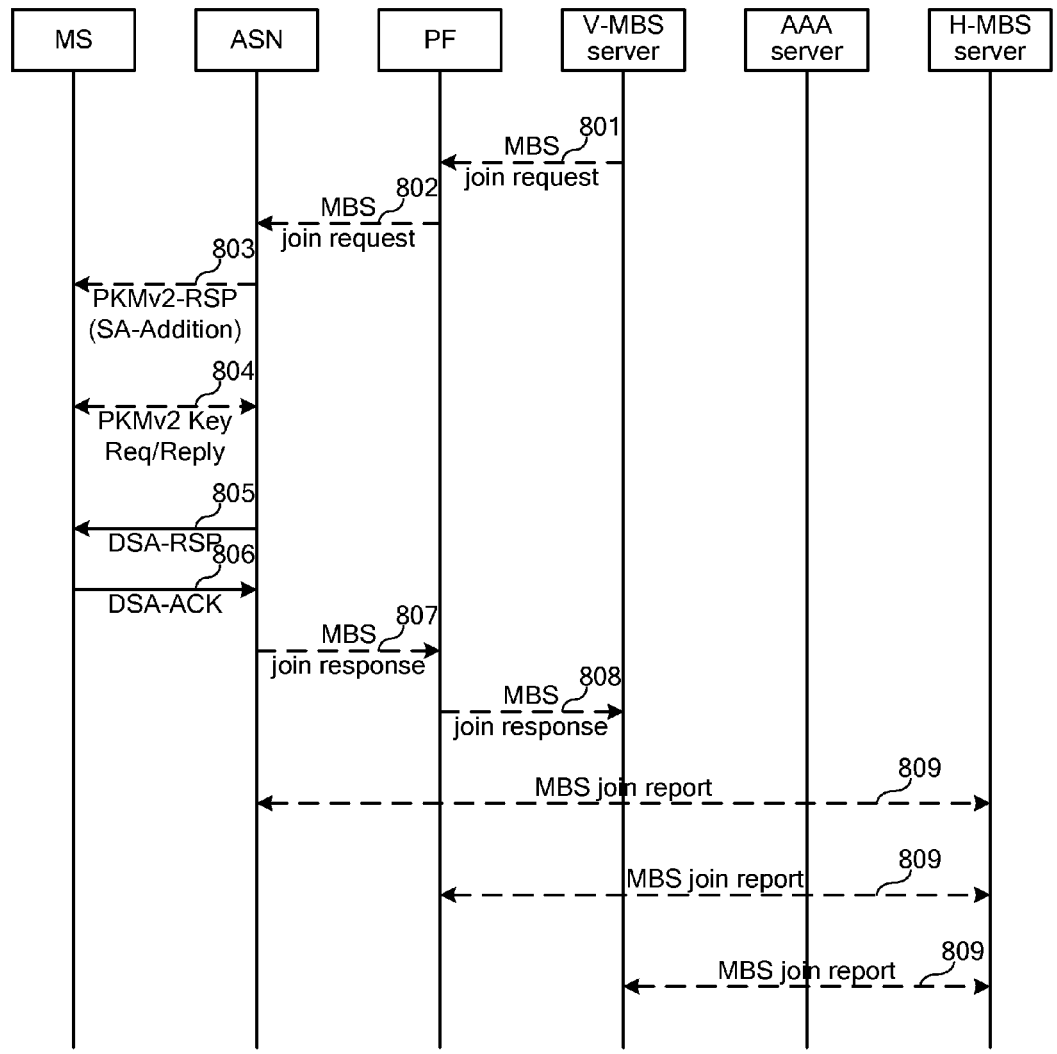
FIG. 8 is a flow chart of a method for a terminal to join an MBS in a wireless network according to a ninth embodiment of the present invention.

A ninth embodiment of the present invention relates to a method for a terminal to join an MBS in a wireless network, as shown in FIG. 8. In this embodiment, the network actively requests the terminal to join the MBS, and the terminal that requests for joining the MBS must pass an MBS security authentication.

If the ASN has an MBS authentication result and/or MBS subscription information of the terminal, Step 803 may be directly performed. Alternatively, if the V-PF has the MBS authentication result and/or MBS subscription information of the terminal, Step 802 may be directly performed. If the V-MBS server has the MBS authentication result and/or MBS subscription information of the terminal, Step 801 is performed.

In Step 801, a V-MBS server sends an MBS join request message a PF. The message carries a user ID (for example, NAI), an MBS ID of the requested MBS, and/or a multicast indication. The request may also be sent by an MBS server triggered by an AAA server, the PF, or an ASN.

In Step 802, the PF sends an MBS join request message to the ASN. The message also carries the user ID (for example, NAI), the MBS ID of the requested MBS, and/or the multicast indication. The ASN further includes a BS, a serving SFA, and an anchor SFA, and the transmission path of the request message among the functional entities is: anchor SFA->serving SFA->BS. Then, Step 803 is performed.

Steps 803-806 are similar to Steps 707-710, and the details will not be described herein again. Steps 803-804 and Steps 805-806 may be performed in any sequence.

After the ASN receives a response message of the terminal, Step 807 is performed. In this step, the ASN sends an MBS join response message to the PF. The message carries a user ID (for example, NAI), an join result of the terminal, an MBS ID, and/or a multicast indication.

In Step 808, the PF sends an MBS join response message to the V-MBS server. The message carries a user ID (for example, NAI), an join result of the terminal, an MBS ID, and/or a multicast indication.

For a roaming scenario, Step 809 is then performed. In this step, the ASN, the PF, or the V-MBS server optionally sends an MBS join report message of the terminal to an H-MBS server and/or an H-AAA server to notify the H-MBS server and/or the H-AAA server that the terminal joins the multicast service, so as to support the accounting. If the V-MBS server and the H-MBS server cannot directly communicate with each other, they need to communicate through the V-AAA server and the H-AAA server.

Thus, the terminal successfully obtains the MBS multicast parameters. If the terminal has obtained application layer information such as the MAK and the context thereof, the terminal can receive a corresponding MBS on a bearer indicated by the multicast parameters according to the MTK generated from the MBS ID, the MAK, and the MGTEK. If the terminal has not obtained the MAK and the context thereof, the terminal may send a request to the MBS network to request the MAK and the context thereof.

In addition, in this embodiment, the transmission path of the MBS join request and response messages may also be: MBS server<->MBS proxy<->BS<->terminal.

In this embodiment, the MBS server and the MBS proxy may also be combined into an MBS server. That is, the MBS server is located on the ASN-GW or located within the ASN as an independent network element. At this time, Step 801 and Step 808 may be omitted.

The above embodiments are all implemented under the prerequisite that the network completes the MBS resource configuration.

Figure 9:
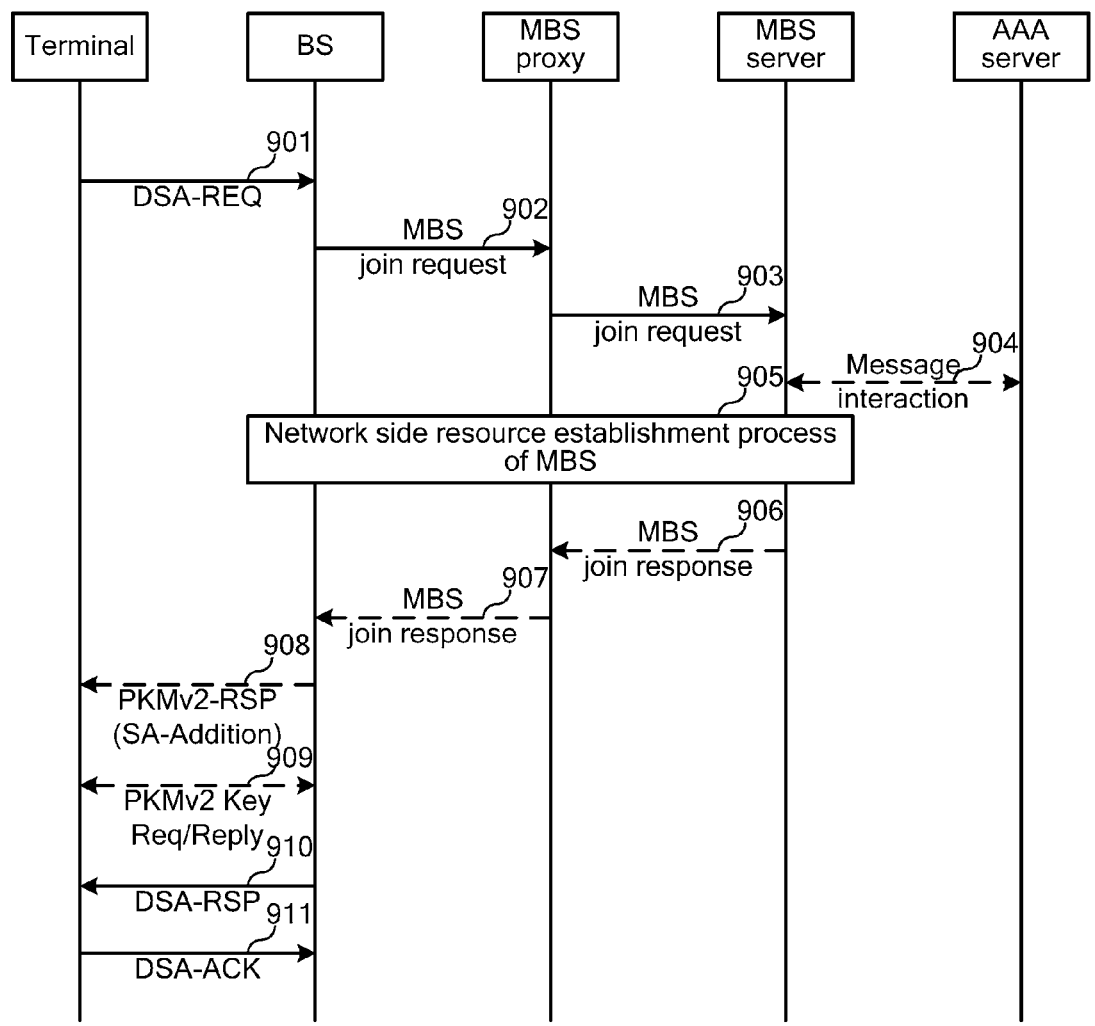
FIG. 9 is a flow chart of a method for a terminal to join an MBS in a wireless network according to a tenth embodiment of the present invention.

In a tenth embodiment of the present invention, when a terminal requests for joining an MBS, the network has not performed MBS resource configuration, and the process of this embodiment triggers the network to perform a corresponding MBS resource configuration. The tenth embodiment of the present invention also relates to a method for a terminal to join an MBS in a wireless network. Referring to FIG. 9, the method includes the following steps.

In Step 901, a terminal sends a DSA-REQ message to a BS through an air interface. The message carries an MBS ID of the requested MBS. The MBS ID may be an IP multicast address/port number, and/or an MBS content ID, and/or an authorization token, and/or an MBS zone ID.

In Step 902, after receiving the message, the BS sends an MBS join request message to an MBS proxy. The message carries a user ID (for example, MSID), an MBS ID of the requested MBS, and/or a multicast indication.

In Step 903, after receiving the message, the MBS proxy sends an MBS join request message to an MBS server. The message carries a user ID (for example, NAI) and an MBS ID of the requested MBS.

In Step 904, after receiving the request, the MBS server may interact with an AAA server to perform an MBS authentication and/or user authentication on the terminal, or determine whether the MBS requested by the terminal has passed an authorization. If the MBS server has known an MBS authentication result of the terminal, Step 905 may be directly performed.

If the terminal passes the authentication/authorization, and the MBS server determines that the MBS network that the terminal intends to join has not been configured, Step 905 is performed. In this step, the MBS server, the MBS proxy, and all BSs within one MBS zone perform an MBS configuration process at the network. The MBS configuration process is not covered by the scope of the present invention, so the details will not be described herein. Through this process, the network allocates parameters, reserves resources, and establishes a bearer for the MBS.

After the MBS server receives a trigger indication indicating that the network has successfully established resources, Step 906 is performed. In this step, the MBS server sends an MBS join response message to the MBS proxy. The message carries a user ID (for example, NAI), a policy result, and an MBS ID. The MBS ID may be an FID, an MBS content ID, or an IP multicast address/port number.

In Step 907, the MBS proxy sends an MBS join response message to the BS. The message carries a user ID (for example, MSID), a policy result, and an MBS ID.

Steps 908-911 are similar to Steps 607-610, and the details will not be described herein again.

Thus, the terminal successfully obtains the MBS multicast parameters. If the terminal has obtained application layer information such as the MAK and the context thereof, the terminal can receive a corresponding MBS on a bearer indicated by the multicast parameters according to the MBS ID, the MAK, the security key, and the like. If the terminal has not obtained the MAK and the context thereof, the terminal may send a request to the MBS network to request the MAK and the context thereof.

In addition, the transmission path of the MBS request and response messages in this embodiment may also be: terminal <-> BS <-> serving SFA <-> anchor SFA <-> PF<-> MBS server (<->AAA server). In this embodiment, the MBS server and the MBS proxy may also be combined into an MBS server. That is, the MBS server is located on the ASN-GW or located within the ASN as an independent network element. At this time, Step 903 and Step 906 may be omitted.

In the present invention, the messages in the MBS join request process of the terminal may be transmitted along the following transmission paths. Since the methods are similar, only several examples are described in the above embodiments, and the rest will not be described in detail herein.

Figure 10:
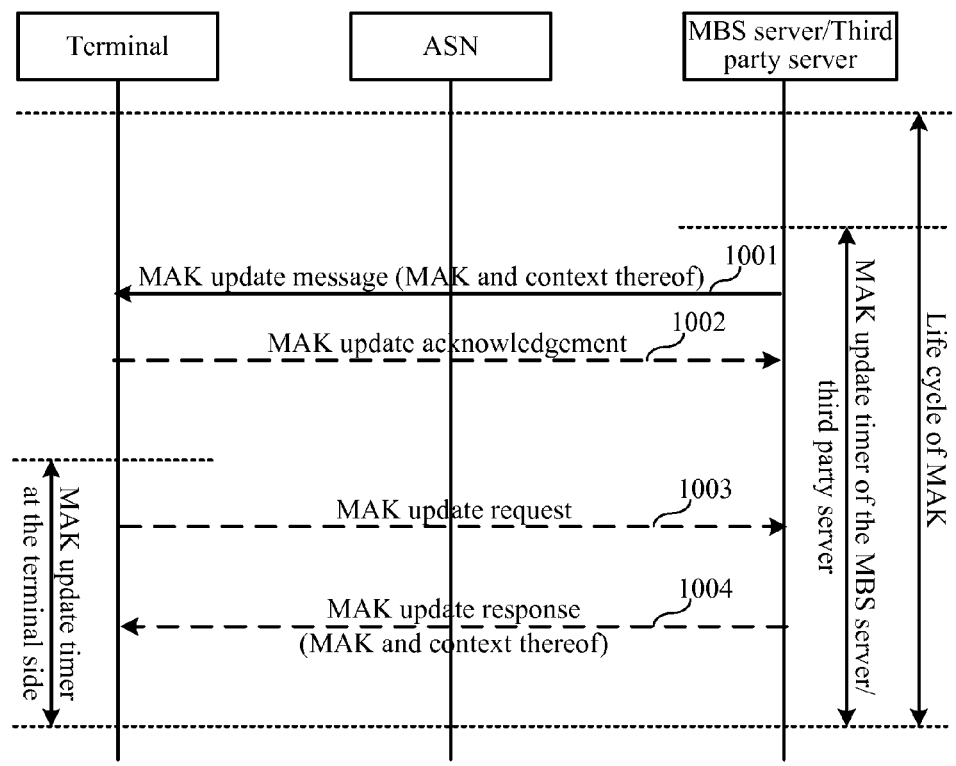
FIG. 10 is a flow chart of a method for updating a MAK according to an eleventh embodiment of the present invention.

(1) Terminal <-> serving ASN <-> anchor SFA <-> PF <-> MBS server (<-> AAA server)
(2) Terminal <-> serving ASN <-> PF <-> MBS server (<-> AAA server)
(3) Terminal <-> serving ASN <-> anchor SFA <-> MBS server (<->AAA server)
(4) Terminal <-> serving ASN <-> anchor data path function (DPF)/FA<-> MBS server (<-> AAA server)
(5) Terminal <-> serving ASN <-> MBS server (<->AAA server)
(6) Terminal <-> serving ASN <-> anchor DPF/FA<->AAA server
(7) Terminal <-> serving ASN <-> AAA server
(8) Terminal <-> serving ASN <-> anchor SFA<-> AAA server
(9) Terminal <-> serving ASN <-> anchor SFA<-> PF <-> AAA server
(10) Terminal <-> serving ASN <-> PF<-> AAA server An eleventh embodiment of the present invention relates to a method for updating an MAK. Referring to FIG. 10, the method includes the following steps.

In this embodiment, an MBS server or a third party server side and a terminal side respectively maintain a timer. A timer cycle of the MBS server or the third party server side is longer than that of the terminal side, and the two timer cycles are both shorter than the life cycle of the MAK.

When an MAK update timer of the MBS server or the third party server side is started, Step 1001 is performed. In this step, the MBS server or the third party server actively sends an updated MAK and a context thereof to the terminal.

Then, Step 1002 is performed. In this step, after receiving the updated MAK and the context thereof, the terminal optionally sends an MAK update acknowledgement message to the MBS server or the third party server.

If the terminal has not obtained the updated MAK and the context thereof when an MAK update timer at the terminal side is started, Step 1003 is performed. In this step, the terminal sends an MAK update request message to the MBS server or the third party server.

Then, Step 1004 is performed. In this step, after receiving the request, the MBS server or the third party server sends the updated MAK and the context thereof to the terminal.

The MAK update timer at the terminal side may be a TEK Grace Time timer.

A twelfth embodiment of the present invention relates to a wireless communication system, which includes a terminal and a network. The network includes a unit adapted to initiate an MBS join process to the terminal and provide MBS parameters to the terminal when the terminal accesses a network or requires dynamically establishing an MBS. The MBS parameters include a first ID indicating an air interface connection and a second ID indicating MBS content. The terminal further includes a unit adapted to obtain the MBS parameters from the network, a unit adapted to receive the MBS content indicated by the second ID from the air interface connection indicated by the first ID according to the obtained MBS parameters, and/or a unit adapted to send an MBS join request message to the network to initiate an MBS join process and obtain the MBS parameters.

In addition, the network may also further include one or any combination of the following units:

a unit adapted to determine whether the terminal is capable of receiving the MBS;

a unit adapted to perform an MBS authentication on the terminal;

a unit adapted to reserve resources for the MBS;

a unit adapted to establish a bearer channel for the MBS;

a unit adapted to register the MBS and/or update a downlink providing list of the MBS; and a unit adapted to generate a key for the MBS.

The above units may be one or any combination of: a BS, an ASN-GW and/or an MBS proxy, an MBS server, and an AAA server.

A thirteenth embodiment of the present invention relates to a wireless communication system, which includes an MBS network and a bearer network. The MBS network may be independent of or integrated with the bearer network. The MBS network is adapted to perform an MBS authentication on a terminal and deliver an MAK to the terminal after the authentication is passed. The bearer network is adapted to deliver multicast parameters and a MGTEK of an MBS to the terminal after the requested MBS passes an authorization, and to instruct the terminal to receive a corresponding MBS on a bearer indicated by the multicast parameters according to an MTK generated from the MAK and the MGTEK. The MBS network may deliver the MAK to the terminal when the MBS network receives a request from the terminal or a preset condition is satisfied (for example, when the terminal accesses the network, the MBS resource configuration has been completed, or the MBS network is triggered by the bearer network). The bearer network may deliver the multicast parameters and the MGTEK of the MBS when requesting the terminal to join the MBS or receiving an MBS join request message of the terminal. The bearer network may further include one or any combination of an ASN, a V-CSN, and an H-CSN. The MBS network may further include one or any combination of a V-MBS server, an H-MBS server, a V-AAA server, an H-AAA server, a content provider, and a third party application server. The MBS is eventually sent to the terminal through the bearer network. The bearer network may have sent the MBS before the terminal accesses the network.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for a terminal to join a multicast broadcast service (MBS) in a wireless communication network, comprising:
    receiving, by the terminal, MBS parameters from a Base Station (BS) of the wireless communication network, wherein the MBS parameters comprise a first identity (ID) indicating an air interface connection and a second ID indicating MBS content;
    obtaining, by the terminal, an MBS group traffic encryption key (MGTEK);
    generating, by the terminal, an MBS traffic key (MTK) by using the MGTEK and an MBS authorization key (MAK) delivered by the network to the terminal; and
    receiving, by the terminal, the MBS content indicated by the second ID from the air interface connection indicated by the first ID according to the generated MTK.

2. The method according to claim 1, wherein before the receiving, by the terminal, the MBS content, the method further comprises: sending, by the terminal, an MBS join request to the BS, wherein the MBS loin request sent by the terminal comprises the second ID.

3. The method according to claim 2, wherein after the sending, by the terminal, the MBS join request, the method further comprises:
    sending, by the BS or an access service network gateway (ASN-GW) of the wireless communication network, an MBS authentication request to an MBS server or a policy function (PF) entity of the wireless communication network, wherein the MBS authentication request comprises information identifies the terminal; and
    performing, by the MBS server or the PF, an MBS authentication on the terminal according to the information identifies the terminal and MBS authentication information of the terminal, and sending an MBS authentication result to the ASN-GW or the BS.

4. The method according to claim 2, wherein
    the first ID comprises an air interface unicast connection ID (CID), an air interface multicast CID (MCID), or an air interface broadcast ID;
    the second ID comprises an MBS content ID or an Internet Protocol (IP) multicast address of a multicast group.

5. The method according to claim 1, wherein the receiving, by the terminal, the MBS parameters from the BS of the wireless communication network comprises:
    when the terminal accessing the network or requiring dynamically establishing an MBS, receiving, by the terminal, an MBS join request sent from the BS, wherein the MBS join request comprises the MBS parameters.

6. The method according to claim 5, wherein before receiving, by the terminal, the MBS content, the method further comprises:
    sending, by an access service network gateway (ASN-GW) or an MBS proxy of the wireless communication network, a resource reservation request (RR-REQ) to the BS to reserve sources for transmitting the MBS content between the BS and the ASN-GW.

7. The method according to claim 5, wherein before receiving, by the terminal, the MBS content, the method further comprises:
    sending, by an access service network gateway (ASN-GW) or an MBS proxy of the wireless communication network, a bearer channel establishment request to the BS to establish a corresponding bearer channel for transmitting the MBS content between the BS and the ASN-GW.

8. The method according to claim 1, further comprising: subscribing, by the terminal, to the MBS, and obtaining the MAK from an MBS server of the wireless communication network.

9. The method according to claim 1, wherein the MGTEK is generated by the BS or is obtained by the BS from an access service network gateway (ASN-GW) or an MBS proxy of the wireless communication network.

10. The method according to claim 1, wherein
    the first ID comprises an air interface unicast connection ID (CID), an air interface multicast CID (MCID), or an air interface broadcast ID;
    the second ID comprises an MBS content ID or an Internet Protocol (IP) multicast address of a multicast group.

11. The method according to claim 10, wherein
    the MBS parameters further comprise one or any combination of:
    an MBS zone ID, an MBS content ID, a Group Security Association (GSA) ID, a Unicast Security Association ID, MBS quality of service (QoS) parameters, and an MBS flow ID (SFID) corresponding to the MBS.

12. The method according to claim 1, wherein before receiving, by the terminal, the MBS content, the method further comprises:
    sending, by the BS, a resource reservation request (RR-REQ) to an access service network gateway (ASN-GW) or an MBS proxy of the wireless communication network to reserve sources for transmitting the MBS content between the BS and the ASN-GW.

13. A terminal for joining a multicast broadcast service (MBS) in a wireless communication network, comprising:
    a receiver, configured to receive MBS parameters from a Base Station (BS) of the wireless communication network, wherein the MBS parameters comprise a first identity (ID) indicating an air interface connection and a second ID indicating MBS content and receive an MBS group traffic encryption key (MGTEK); and
    a processor, configured to generate an MBS traffic key (MTK) by using the MGTEK and an MBS authorization key (MAK) delivered by the network to the terminal;
    wherein the receiver is further configured to receive the MBS content indicated by the second ID from the air interface connection indicated by the first ID according to the generated MTK.

14. The terminal according to claim 13, wherein the terminal further comprises a transmitter configured to send an MBS join request to the BS, wherein the MBS join request comprises the second ID.

15. The terminal according to claim 13, wherein the receiver is further configured to receive an MBS join request from the BS, when the terminal accessing the network or requiring dynamically establishing an MBS, wherein the MBS join request comprises the MBS parameters.

16. The terminal according to claim 13, wherein
    the first ID comprises an air interface unicast connection ID (CID), an air interface multicast CID (MCID), or an air interface broadcast ID;
    the second ID comprises an MBS content ID or an Internet Protocol (IP) multicast address of a multicast group.

17. A wireless communication system, comprising:
    a multicast broadcast service (MBS) service network equipment, configured to deliver an MBS authorization key (MAK) to a terminal; and a bearer network equipment, configured to deliver multicast parameters and an MBS group traffic encryption key (MGTEK) of an MBS to the terminal and to instruct the terminal to receive a corresponding MBS content on a bearer indicated by the multicast parameters according to an MBS traffic key (MTK) generated from the MAK and the MGTEK.

18. The system according to claim 17, wherein the MBS service network equipment is further configured to delivers the MAK to the terminal when the MBS service network equipment receives a request from the terminal or when a preset condition is satisfied.

19. The system according to claim 17, wherein the multicast parameters comprise a first identity (ID) indicating an air interface connection and a second ID indicating the MBS content.

20. The system according to claim 19, wherein
the first ID comprises an air interface unicast connection ID (CID), an air interface multicast CID (MCID), or an air interface broadcast ID;
the second ID comprises an MBS content ID or an Internet Protocol (IP) multicast address of a multicast group.

* * * * *